United States Patent
Zhu et al.

(10) Patent No.: US 11,162,028 B2
(45) Date of Patent: *Nov. 2, 2021

(54) LIQUID CRYSTAL COMPOSITION AND APPLICATION THEREOF

(71) Applicant: Jiangsu Hecheng Display Technology Co., Ltd., Yangzhong (CN)

(72) Inventors: Beibei Zhu, Yangzhong (CN); Haibin Xu, Yangzhong (CN); Pengfei Li, Yangzhong (CN); Di He, Yangzhong (CN); Shuang Xu, Yangzhong (CN)

(73) Assignee: Jiangsu Hecheng Display Technology Co., Ltd., Yangzhong (CN)

( * ) Notice: Subject to any disclaimer, the term of this patent is extended or adjusted under 35 U.S.C. 154(b) by 84 days.

This patent is subject to a terminal disclaimer.

(21) Appl. No.: 16/608,260

(22) PCT Filed: Jun. 28, 2018

(86) PCT No.: PCT/CN2018/093420
§ 371 (c)(1),
(2) Date: Oct. 25, 2019

(87) PCT Pub. No.: WO2019/001522
PCT Pub. Date: Jan. 3, 2019

(65) Prior Publication Data
US 2020/0123442 A1    Apr. 23, 2020

(30) Foreign Application Priority Data
Jun. 30, 2017  (CN) .......................... 201710523384.9

(51) Int. Cl.
*G02F 1/1333*   (2006.01)
*C09K 19/30*    (2006.01)
*C09K 19/12*    (2006.01)

(52) U.S. Cl.
CPC .......... *C09K 19/3003* (2013.01); *C09K 19/12* (2013.01); *C09K 19/3028* (2013.01); *C09K 19/3068* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3021* (2013.01); *C09K 2019/3025* (2013.01);
(Continued)

(58) Field of Classification Search
CPC ............... C09K 19/3003; C09K 19/12; C09K 19/3028; C09K 19/3068; C09K 2019/122; C09K 2019/123; C09K 2019/3004; C09K 2019/3009; C09K 2019/301; C09K 2019/3016; C09K 2019/3021; C09K 2019/3025; C09K 2019/3036; C09K 2019/3037; C09K 2019/3078; G02F 1/1333

USPC ..................................................... 252/299.63
See application file for complete search history.

(56) References Cited

U.S. PATENT DOCUMENTS

| | | |
|---|---|---|
| 5,141,669 A | 8/1992 | Bloom et al. |
| 5,178,794 A | 1/1993 | Takatsu et al. |
| 5,286,411 A | 2/1994 | Rieger et al. |
| 5,480,581 A | 1/1996 | Plach et al. |
| 5,753,142 A | 5/1998 | Plach et al. |
| 6,210,761 B1 | 4/2001 | Kondo et al. |

(Continued)

FOREIGN PATENT DOCUMENTS

| | | |
|---|---|---|
| CN | 1143638 A | 2/1997 |
| CN | 1157005 A | 8/1997 |

(Continued)

OTHER PUBLICATIONS

Hu Minggang, An Zhongwei, Li Jian, "Mesomorphic Properties of Laterally O-difluoro-substituted Biphenyl Liquid Crystals", *Chinese Journal of Liquid Crystals and Displays*, 20070604, pp. 151-155, vol. 22, No. 2.

Neil L. Campbell, Stephen M. Kelly, Rachel P. Tuffin, "Polar 2-alkoxyalkoxy-substituted nematic liquid crystals", *Liquid Crystals*, 20071231, pp. 1443-1453, vol. 34, No. 12.

(Continued)

*Primary Examiner* — Geraldina Visconti
(74) *Attorney, Agent, or Firm* — Hoffmann & Baron, LLP

(57) ABSTRACT

A liquid crystal composition includes at least one compound of general formula I and at least one compound selected from a group consisting of the compounds of general formula II-1 and general formula II-2. The liquid crystal composition provided by the present invention has suitable optical anisotropy, high clearing point, high elastic constants $K_{11}$ and $K_{33}$, and relatively low dielectric anisotropy. When the liquid crystal composition is applied to a liquid crystal display device, the liquid crystal display device may have better weather resistance and higher contrast ratio.

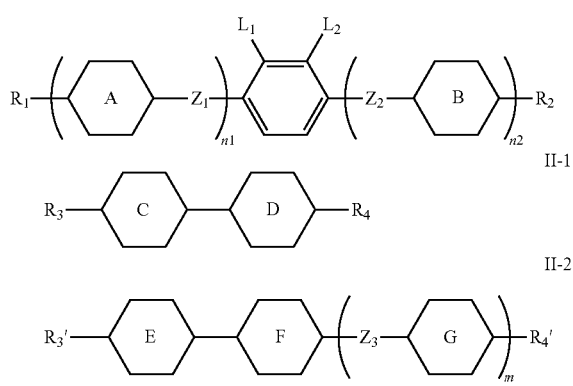

9 Claims, No Drawings

(52) U.S. Cl.
CPC ............... *C09K 2019/3036* (2013.01); *C09K 2019/3037* (2013.01); *C09K 2019/3078* (2013.01)

(56) References Cited

U.S. PATENT DOCUMENTS

| | | | |
|---|---|---|---|
| 7,615,262 | B2 | 11/2009 | Campbell et al. |
| 9,879,182 | B2 | 1/2018 | Fujimori et al. |
| 2004/0149957 | A1 | 8/2004 | Kelly et al. |
| 2006/0115606 | A1 | 6/2006 | Ichinose et al. |
| 2009/0103042 | A1 | 4/2009 | Fujita et al. |
| 2009/0213318 | A1 | 8/2009 | Klasen-Memmer et al. |
| 2017/0015905 | A1 | 1/2017 | Matsumura et al. |
| 2019/0345386 | A1 | 11/2019 | Han et al. |
| 2020/0123442 | A1* | 4/2020 | Zhu ............................ G02F 1/13 |
| 2021/0017450 | A1* | 1/2021 | Wang ..................... C09K 19/42 |

FOREIGN PATENT DOCUMENTS

| | | |
|---|---|---|
| CN | 1778867 A | 5/2006 |
| CN | 1989225 A | 6/2007 |
| CN | 101365768 A | 2/2009 |
| CN | 101880219 A | 11/2010 |
| CN | 105121422 A | 12/2015 |
| CN | 108203583 A | 6/2018 |
| CN | 108203584 A | 6/2018 |
| CN | 108728116 A | 11/2018 |
| CN | 108728117 A | 11/2018 |
| DE | 4218614 A | 12/1993 |
| EP | 1780193 A1 | 5/2007 |
| JP | H3-265683 A | 11/1991 |
| JP | H3-265684 A | 11/1991 |
| JP | H4-117487 A | 4/1992 |
| JP | H7-199233 A | 8/1995 |
| JP | 2005-239639 A | 9/2005 |
| TW | 457289 B | 10/2001 |
| WO | WO 88/08870 A1 | 11/1988 |
| WO | 91/16398 A1 | 10/1991 |
| WO | 91/16399 A1 | 10/1991 |
| WO | 92/02597 A1 | 2/1992 |
| WO | 93/02153 A1 | 2/1993 |
| WO | WO2015/133194 A1 | 9/2015 |

OTHER PUBLICATIONS

Neil L. Campbell, Stephen M. Kelly, Rachel P. Tuffin, "Polar 2-alkoxyalkoxy-substituted nematic liquid crystals", *Liquid Crystals*, 20071231, pp. 1415-1424, vol. 34 ,No. 12.

* cited by examiner

LIQUID CRYSTAL COMPOSITION AND APPLICATION THEREOF

CROSS-REFERENCE TO RELATED APPLICATIONS

This application is the National Stage of International Application No. PCT/CN2018/093420, filed Jun. 28, 2018, which claims the benefit of Chinese Application No. 201710523384.9, filed Jun. 30, 2017, the contents of which is incorporated by reference herein.

TECHNICAL FIELD

The present invention relates to the field of liquid crystal material, in particular to a liquid crystal composition and uses thereof.

BACKGROUND ARTS

Liquid crystal displays (LCDs) have been rapidly developed due to their small size, light weight, low power consumption and excellent display quality, and in particular have been widely used in portable electronic information products. With the increase in the size of liquid crystal display screens for portable computers, office applications and video applications, liquid crystal displays can be used for large screen displays and eventually replace cathode ray tube (CRT) displays.

Based on the types of display mode, liquid crystal displays can be classified into PC (phase change), TN (twisted nematic), STN (super twisted nematic), ECB (electrically controlled birefringence), OCB (optically compensated bend), IPS (in-plane switching), VA (vertical alignment) and so forth.

Liquid crystal materials must have good low-temperature intermiscibility and heat stability. Furthermore, liquid crystal materials should have low viscosity, short response time, low threshold voltage and high contrast ratio. Various performance indexes of the liquid crystal composition are improved to obtain a liquid crystal display device having good characteristics. Various performance indexes of the composition will be further illustrated based on a commercially available crystal liquid display device. The temperature range of a nematic phase is associated with the operating temperature range of the device. A desirable maximum temperature of a nematic phase is 70° C. or more, and a desirable minimum temperature of a nematic phase is −10° C. or less. The viscosity of the composition is associated with the response time of the device. A short response time of the device is desirable for displaying a moving image in the device. Accordingly, a small viscosity of the composition is desirable, and a small viscosity of the composition at a low temperature is more desirable.

The contrast ratio of the liquid crystal display device will be increased if a liquid crystal composition having an appropriate optical anisotropy is comprised.

The base voltage value, driving voltage and further electric power consumption of the liquid crystal display device will be reduced if a liquid crystal composition having a large absolute value of dielectric anisotropy is comprised.

The steepness factor γ has a large effect on the device parameters, wherein $U_{10}$, $U_{50}$ and $U_{90}$ correspond to the voltages at which the changes in TN-LCD transmittance are 10%, 50% and 90%, respectively.

The relational expression between $U_{50}$ and $U_{90}$ in equilibrium state calculated according to the free energy density method is as follows:

$$\gamma=(U50-U90)/U90=0.133+0.0266[(K33/K11)-1]+0.0466[\ln(\Delta\Delta nd/2\lambda)]^2$$

When $\Delta nd/2\lambda=1$, γ is the steepest. This condition is substantially consistent with the minimum light leakage condition $2\Delta nd/\lambda=\sqrt{15}$, a display with large contrast ratio thus can be achieved under this condition. Under this condition, the display device has the least light leakage and the best steepness, wherein X is the incident wavelength.

Therefore, γ is also associated with $K_{33}/K_{11}$ of liquid crystal materials. The smaller the $K_{33}/K_{11}$ of the TN cell, the smaller the γ thereof. However, for the TFT display, the larger the γ, the better the gray scale display. Therefore, it is desirable for the TFT display that the $K_{33}/K_{11}$ is relatively larger.

It is typically difficult for a single liquid crystal compound to present its characteristics, thus a composition is normally prepared by mixing the single liquid crystal compound with various other liquid crystal compounds. Although the liquid crystal compositions in the prior art can present good characteristics, these liquid crystal compositions have disadvantages of: lower clearing point, higher viscosity, optical anisotropy being not larger enough, lower absolute value of dielectric anisotropy, low voltage holding ratio, being not very helpful to mix into a composition with larger optical anisotropy, suitable absolute value of dielectric anisotropy, better stability and better contrast ratio, directly resulting in adverse results such as low contrast ratio, slow response speed, poor device display and so forth. For example, there are above defects in different degrees in foreign patent literatures such as WO9202597, WO9116398, WO9302153, WO9116399 and Chinese patent literature such as CN1157005A.

Therefore, there is a need for a liquid crystal composition which has characteristics such as large optical anisotropy, high absolute value of dielectric anisotropy, high clearing point, low threshold voltage, better reliability, good steepness, good gray scale display effect and so forth.

SUMMARY OF THE INVENTION

Objects: In view of the deficiencies in the prior art, it is an object of the present invention to provide a liquid crystal composition having large optical anisotropy, large absolute value of dielectric anisotropy, wide nematic phase, high low-temperature storage stability and high contrast ratio, as well as a liquid crystal display device comprising the same.

Technical Solutions of the Present Invention

In an aspect, the present invention provides a liquid crystal composition comprising: at least one compound of general formula I

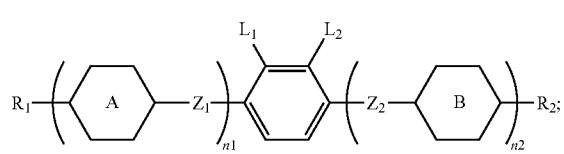

at least one compound selected from a group consisting of the compounds of general formula II-1 and general formula II-2

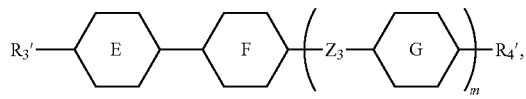
II-1

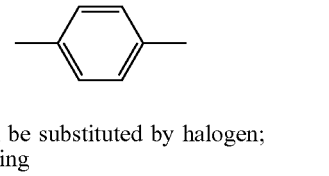
II-2 in which, $R_1$, $R_2$, $R_3$, $R_4$, $R_3'$ and $R_4'$ each independently represents —H, —F, $C_{1-12}$ alkyl or alkoxy, $C_{2-12}$ alkenyl or alkenoxy, —$OR_5OR_6$,

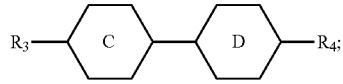 

wherein one or more H on the alkyl or alkoxy and the alkenyl or alkenoxy can be substituted by F, and at least one of $R_1$ and $R_2$ is —$OR_5OR_6$;

$R_5$ and $R_6$ each independently represents $C_{1-12}$ alkyl or $C_{2-12}$ alkenyl;

$Z_1$, $Z_2$ and $Z_3$ each independently represents single bond, —COO—, —OCO—, —CH$_2$O—, —OCH$_2$— or —CH$_2$CH$_2$—;

$L_1$ and $L_2$ each independently represents —F, —Cl, —CN or —NCS;

ring

and ring

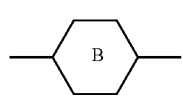

each independently represents

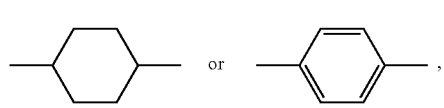

wherein one or more —CH$_2$— in

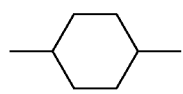

can be replaced by —O—, one or more H on

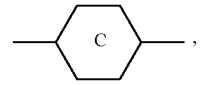

can be substituted by halogen;

ring

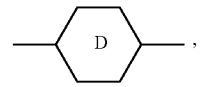, ring

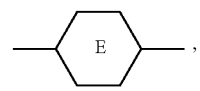, ring

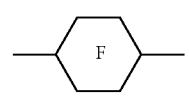, ring

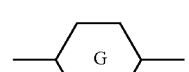

and ring

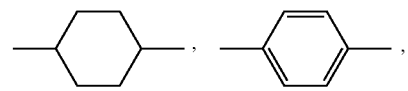

n1 and n2 each independently represents 0, 1, 2 or 3, and when n1 is 2 or 3, ring can be same or different, $Z_1$ can be same or different; when n2 is 2 or 3, ring

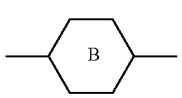

can be same or different, $Z_2$ can be same or different; m represents 1 or 2, and when m is 2, ring

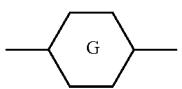

can be same or different, $Z_3$ can be same or different.

Preferably, the compound of general formula I is selected from a group consisting of the following compounds:

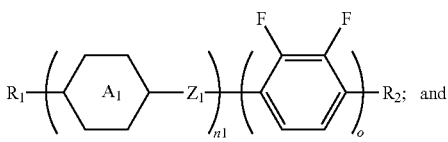

I-1

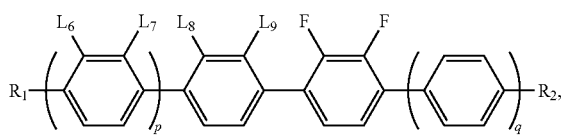

I-2 in which,
ring

represents

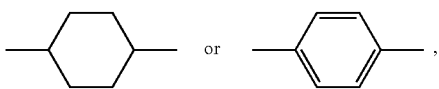

and when n1 is 1, ring

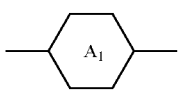

represents

when n1 is 2 or 3, at least one ring

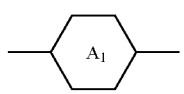

represents

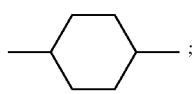

$L_6$, $L_7$, $L_8$ and $L_9$ each independently represents —H or —F;

o represents 1 or 2;

p and q each independently represents 0 or 1.

More preferably, the compound of general formula I-1 is selected from a group consisting of the following compounds:

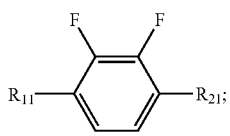

I-1-1

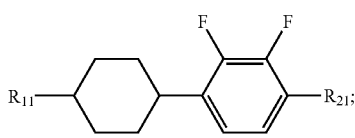

I-1-2

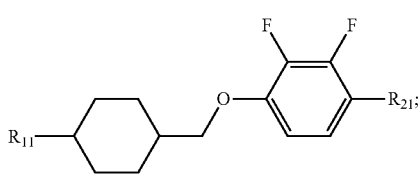

I-1-3

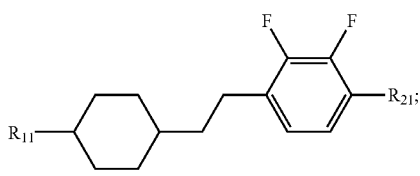

I-1-4

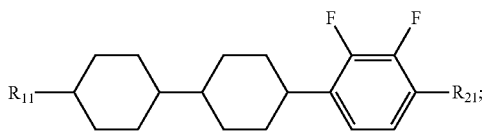

I-1-5

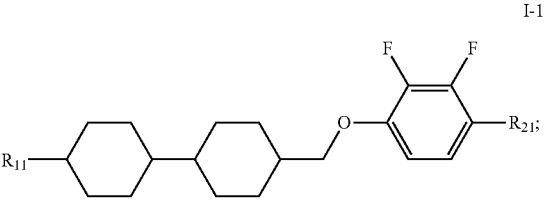

I-1-6

I-1-7
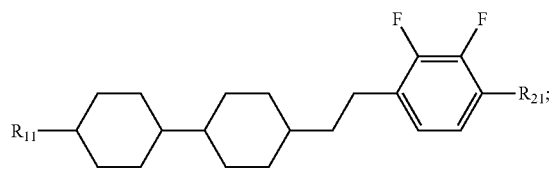

I-1-8
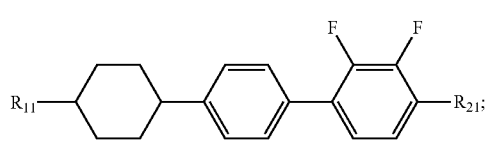

I-1-9
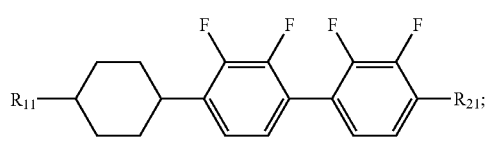

I-1-10
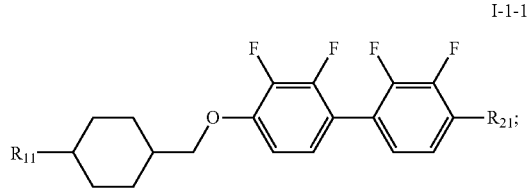

I-1-11
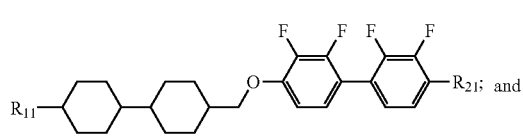

I-1-12
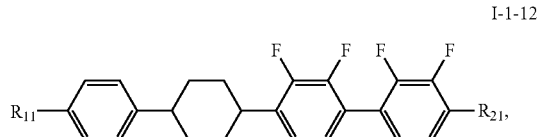

the compound of general formula I-2 is selected from a group consisting of the following compounds:

I-2-1
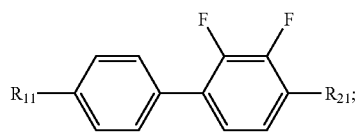

I-2-2
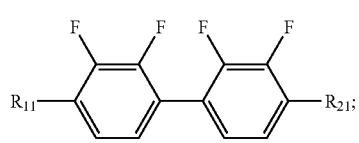

I-2-3
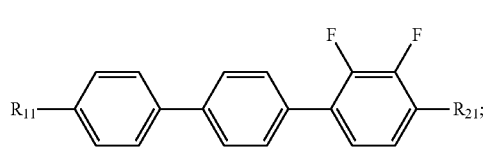

I-2-4
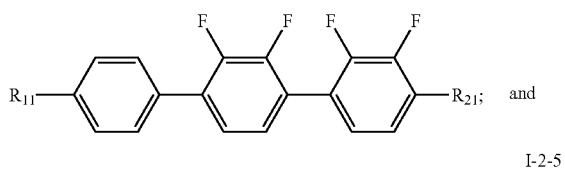

I-2-5
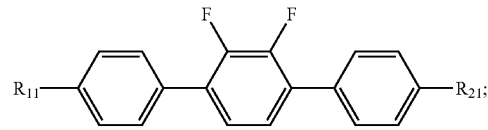

in which, $R_{11}$ and $R_{21}$ each independently represents —H, —F, $C_{1-7}$ alkyl or alkoxy, $C_{2-7}$ alkenyl or alkenoxy, —$OR_{51}OR_{61}$,

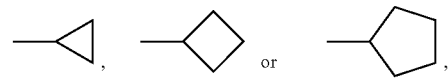

wherein one or more H on the alkyl or alkoxy and the alkenyl or alkenoxy can be substituted by F, and at least one of $R_{11}$ and $R_{21}$ is —$OR_{51}OR_{61}$;

$R_{51}$ and $R_{61}$ each independently represents $C_{1-10}$ alkyl or $C_{2-10}$ alkenyl.

Further, the compound of general formula I-1-1 is selected from a group consisting of the following compounds:

I-1-1-1
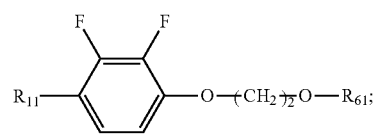

I-1-1-2
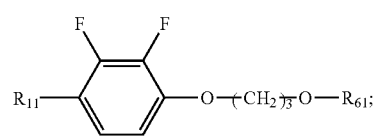

I-1-1-3
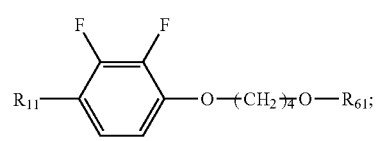

I-1-1-4
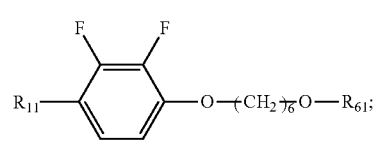

I-1-1-5
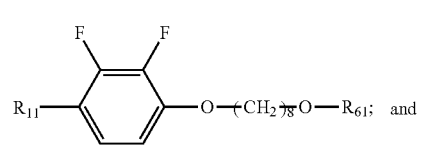

I-1-1-6
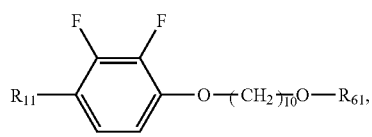
the compound of general formula I-1-2 is selected from a group consisting of the following compounds:
I-1-2-1
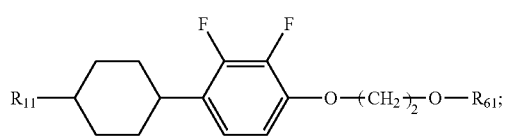
I-1-2-2
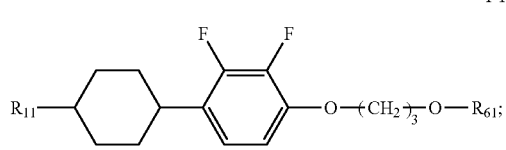
I-1-2-3
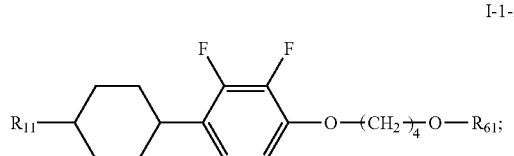
I-1-2-4
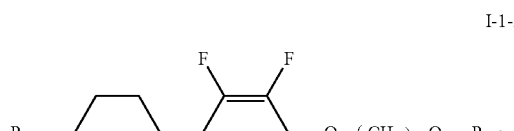
I-1-2-5
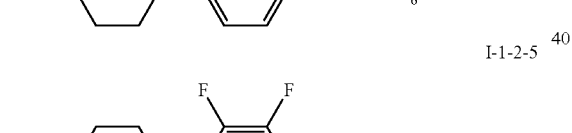
I-1-2-6
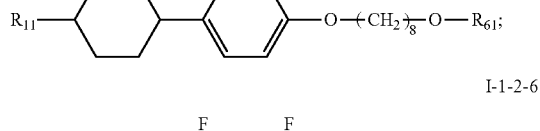
I-1-2-7
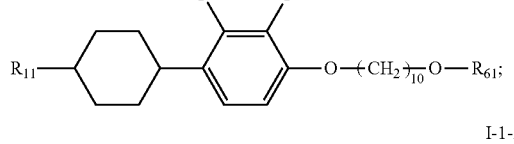
I-1-2-8
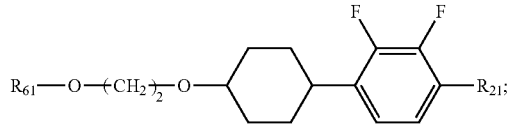
I-1-2-9
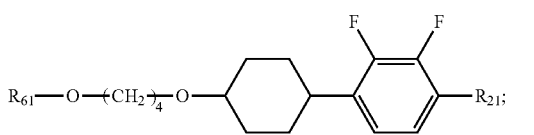
I-1-2-10
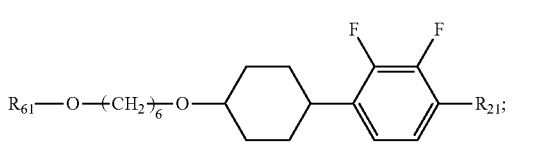
I-1-2-11
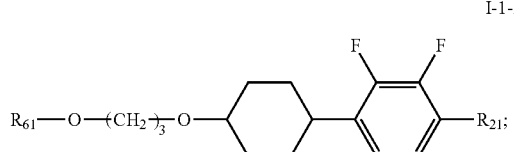 and
I-1-2-12
the compound of general formula I-1-3 is selected from a group consisting of the following compounds:
I-1-3-1
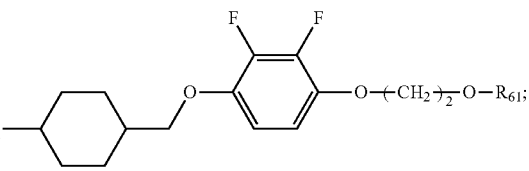
I-1-3-2
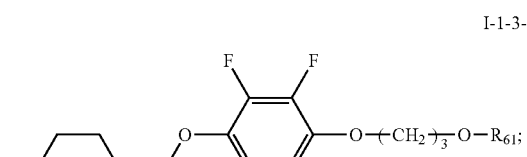
I-1-3-3
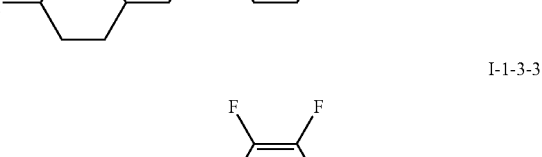
I-1-3-4
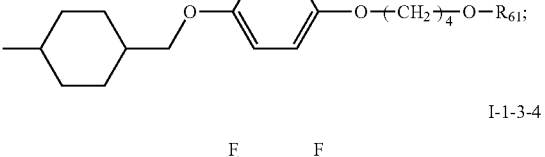
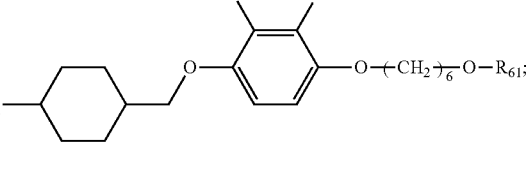

-continued the compound of general formula I-1-4 is selected from a group consisting of the following compounds:

I-1-4-9
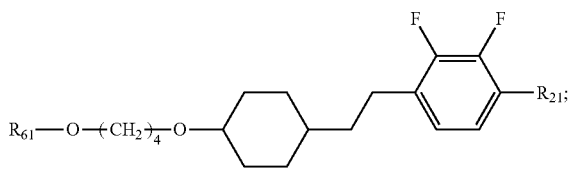
I-1-4-10
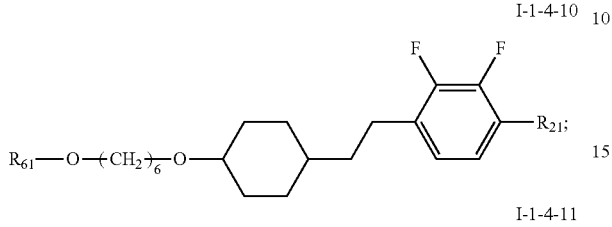
I-1-4-11
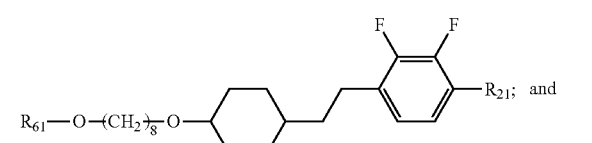
I-1-4-12
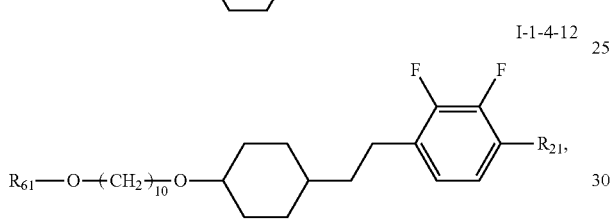
the compound of general formula I-1-5 is selected from a group consisting of the following compounds:
I-1-5-1
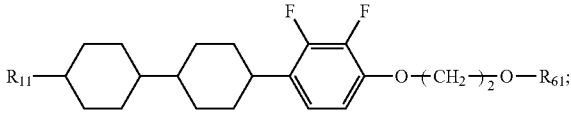
I-1-5-2
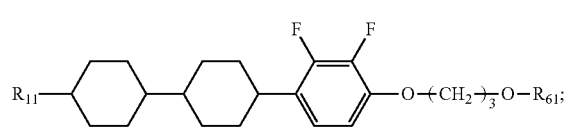
I-1-5-3
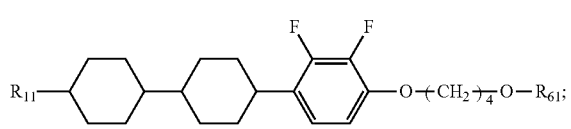
I-1-5-4
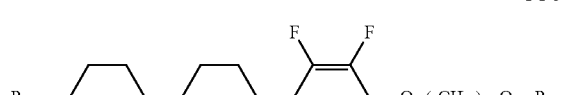
I-1-5-5
I-1-5-6
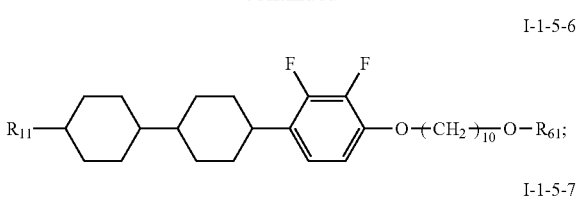
I-1-5-7
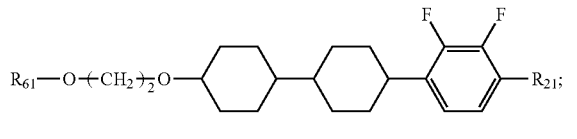
I-1-5-8
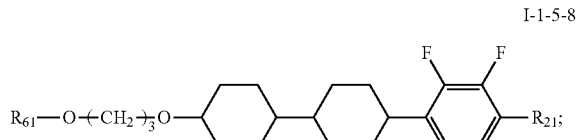
I-1-5-9
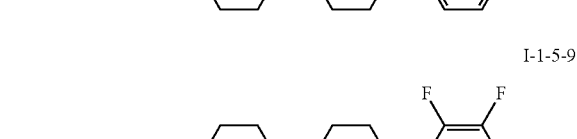
I-1-5-10
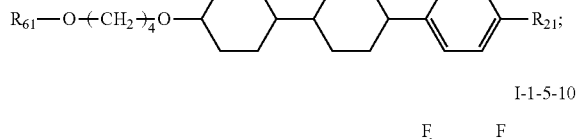
I-1-5-11
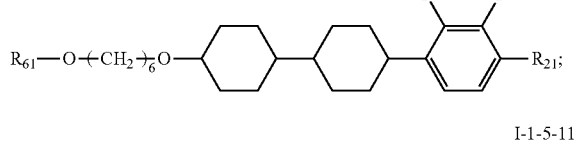
I-1-5-12
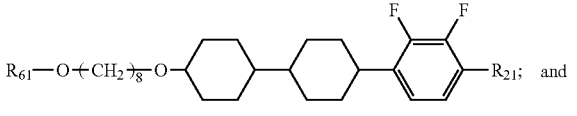
the compound of general formula I-1-6 is selected from a group consisting of the following compounds:
I-1-6-1
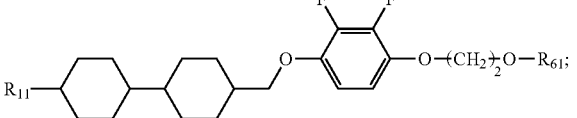
I-1-6-2
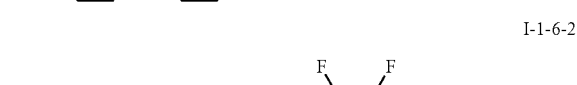

I-1-6-3
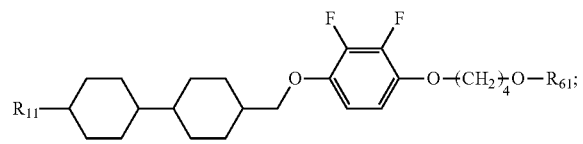
I-1-6-4
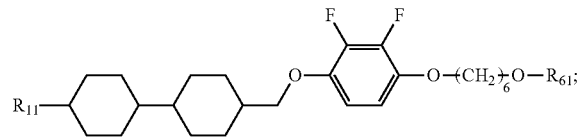
I-1-6-5
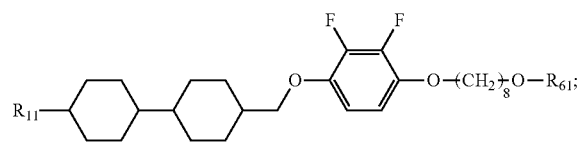
I-1-6-6
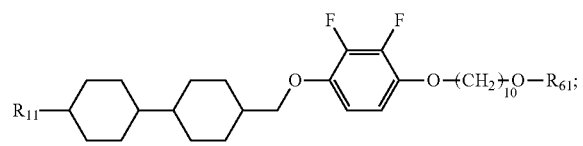
I-1-6-7
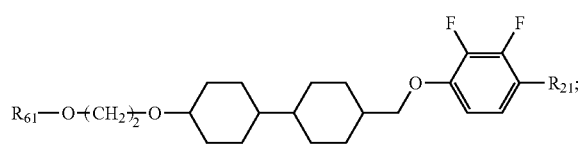
I-1-6-8
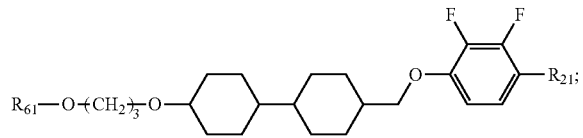
I-1-6-9
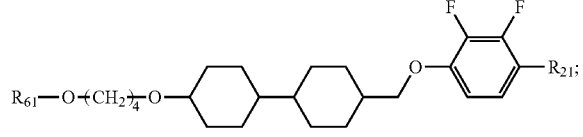
I-1-6-10
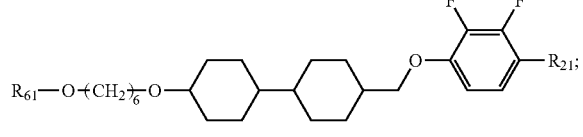
I-1-6-11
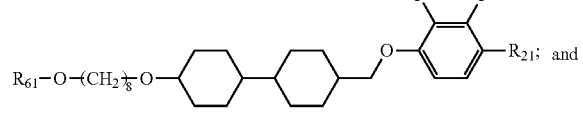
and
I-1-6-12
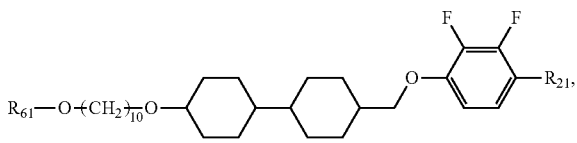
the compound of general formula I-1-7 is selected from a group consisting of the following compounds:
I-1-7-1
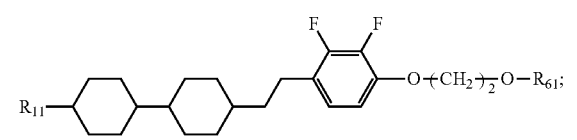
I-1-7-2
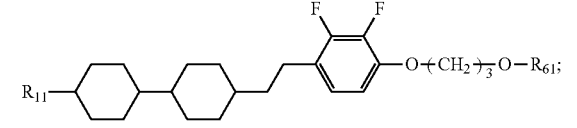
I-1-7-3
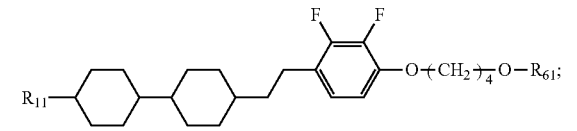
I-1-7-4
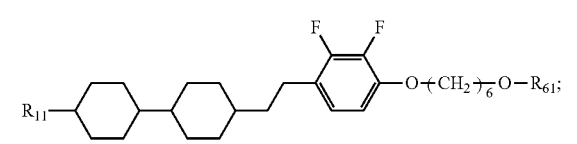
I-1-7-5
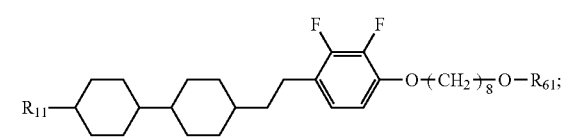
I-1-7-6
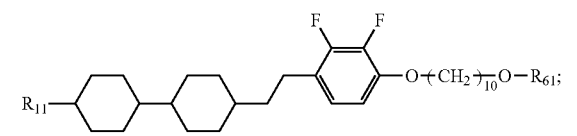
I-1-7-7
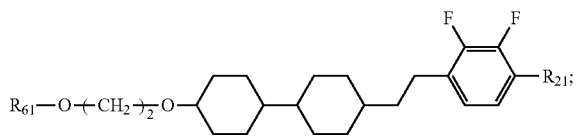
I-1-7-8
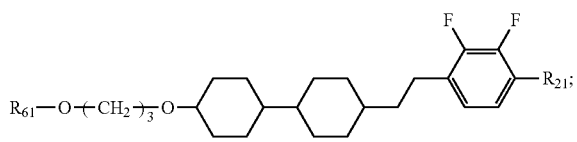

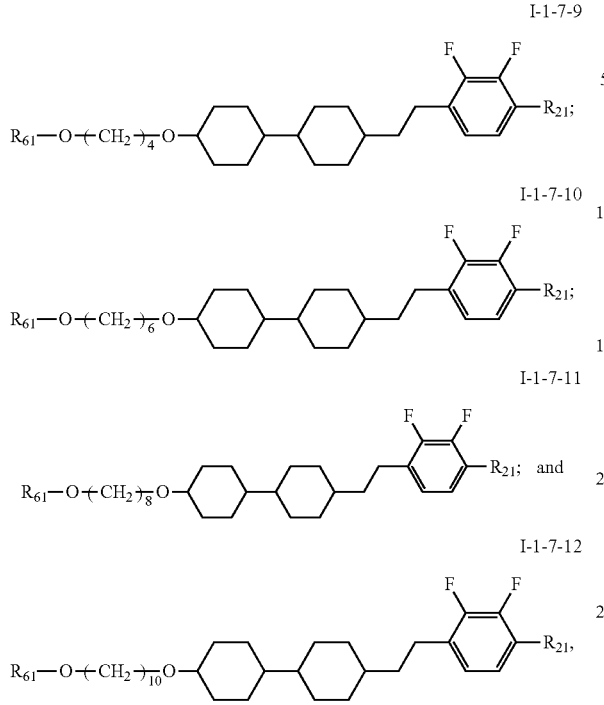
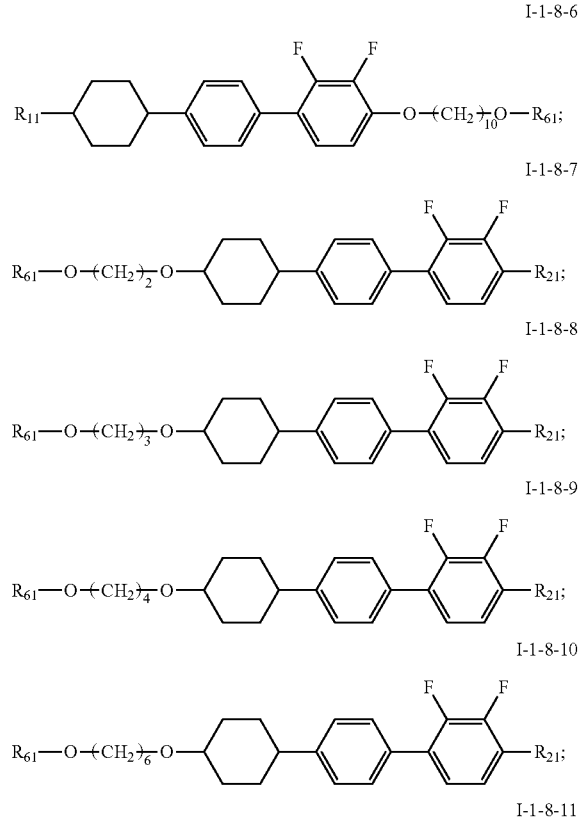
the compound of general formula I-1-8 is selected from a group consisting of the following compounds:
the compound of general formula I-1-9 is selected from a group consisting of the following compounds:
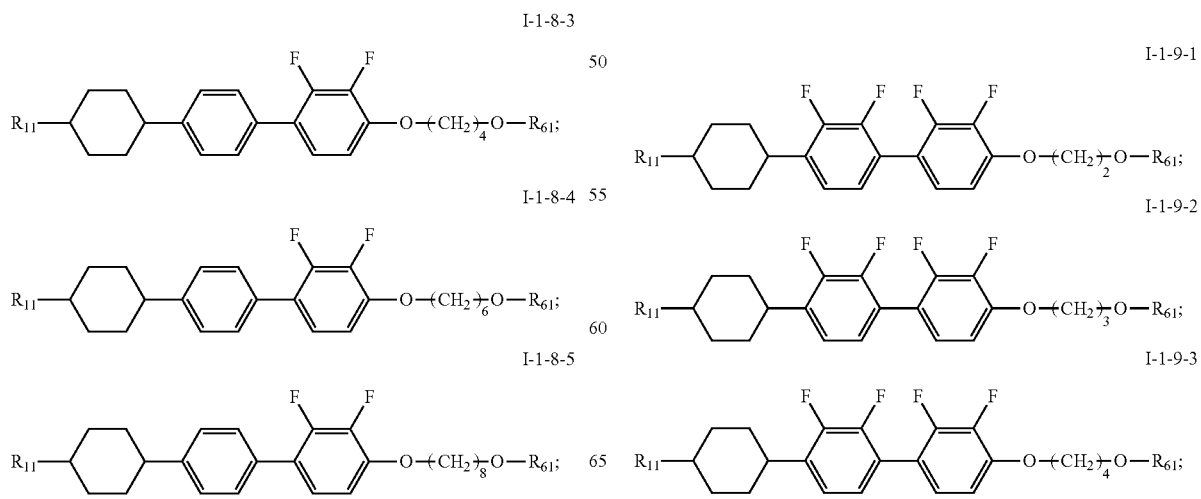

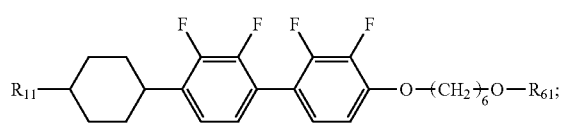
I-1-9-4
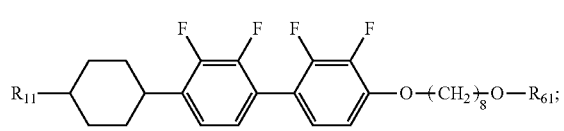
I-1-9-5
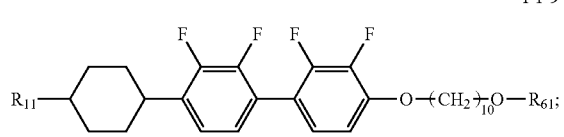
I-1-9-6
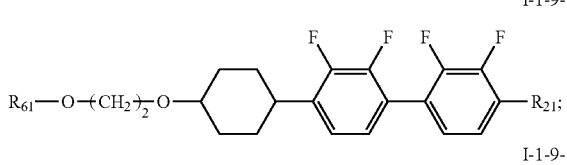
I-1-9-7
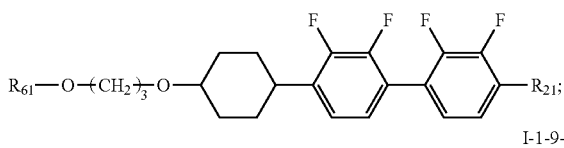
I-1-9-8
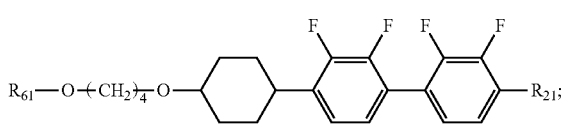
I-1-9-9
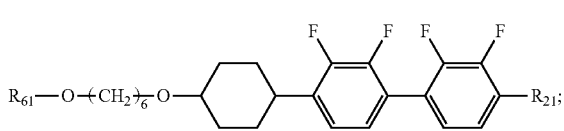
I-1-9-10
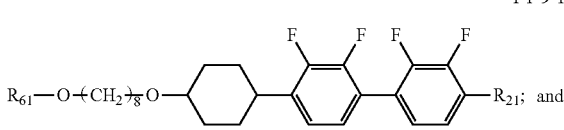
I-1-9-11
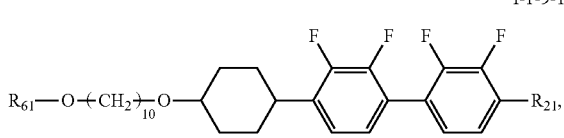
I-1-9-12
the compound of general formula I-1-10 is selected from a group consisting of the following compounds:
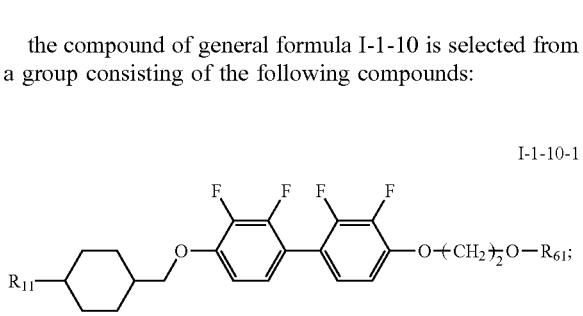
I-1-10-1
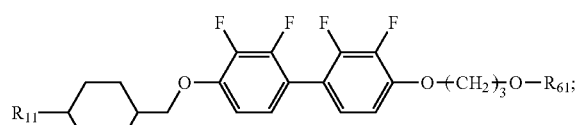
I-1-10-2
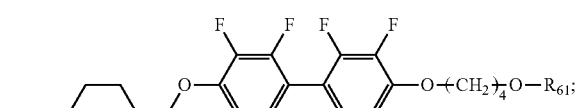
I-1-10-3
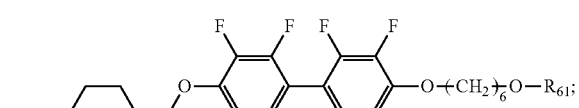
I-1-10-4
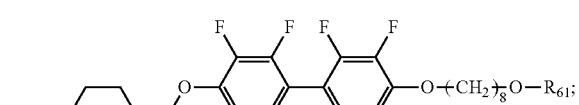
I-1-10-5
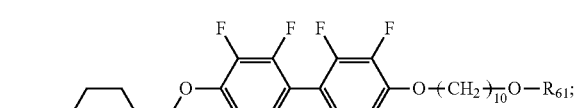
I-1-10-6
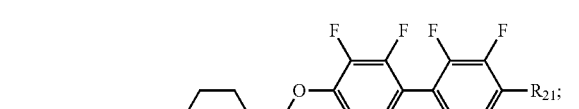
I-1-10-7
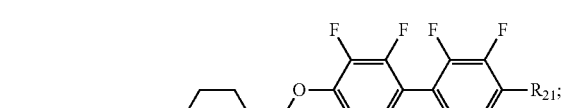
I-1-10-8
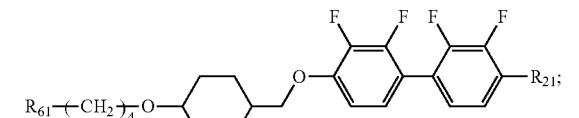
I-1-10-9

-continued
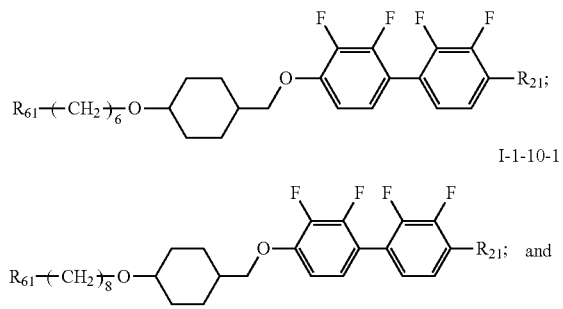
I-1-10-10
I-1-10-11 and
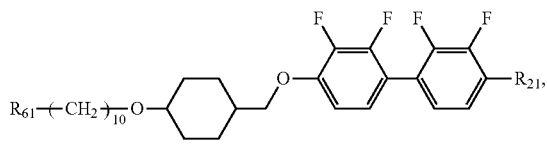
I-1-10-12
the compound of general formula I-1-11 is selected from a group consisting of the following compounds:
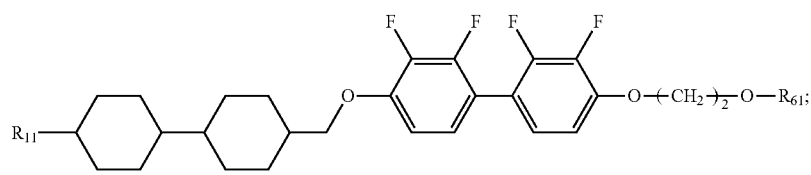
I-1-11-1
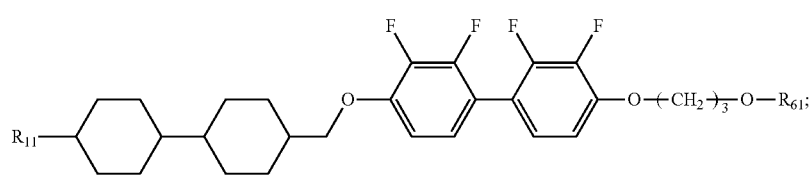
I-1-11-2
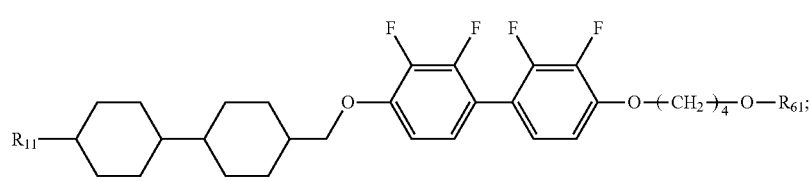
I-1-11-3
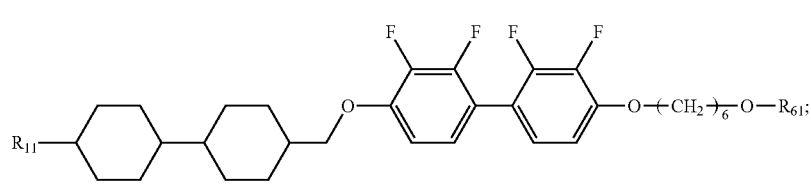
I-1-11-4
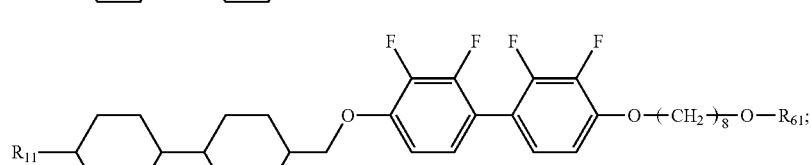
I-1-11-5
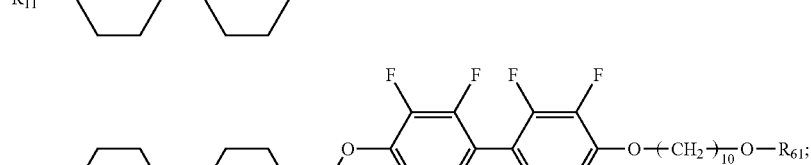
I-1-11-6
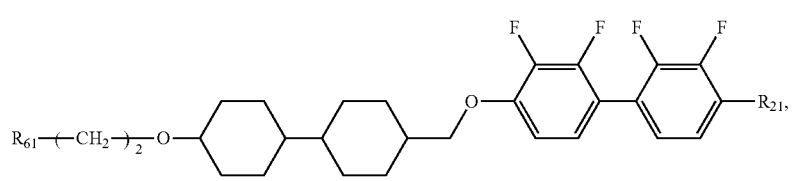
I-1-11-7

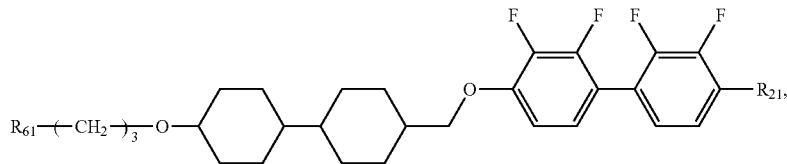
I-1-11-8
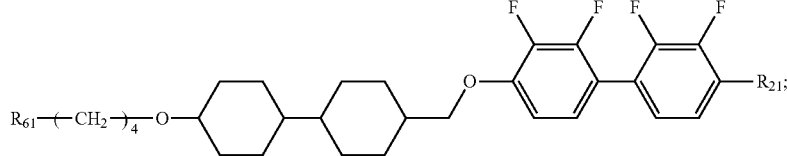
I-1-11-9
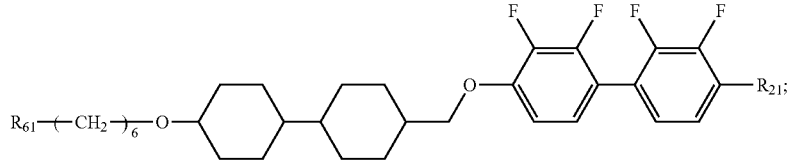
I-1-11-10
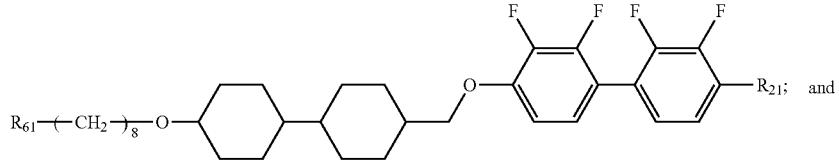
I-1-11-11
and
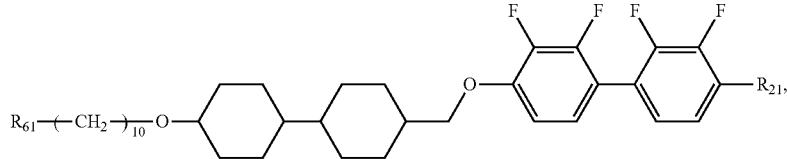
I-1-11-12
the compound of general formula I-1-12 is selected from a group consisting of the following compounds:
I-1-12-1
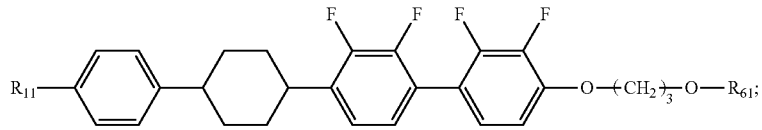
I-1-12-2
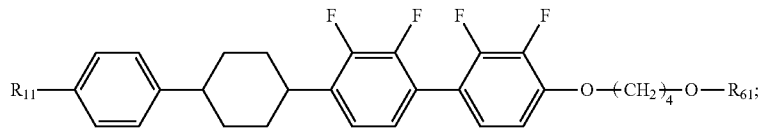
I-1-12-3
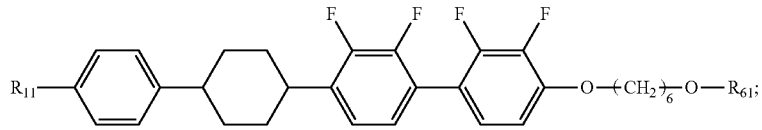
I-1-12-4

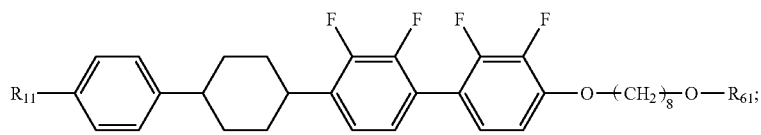
I-1-12-5
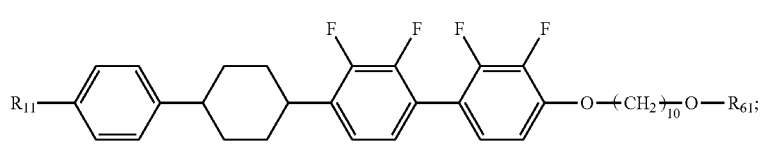
I-1-12-6
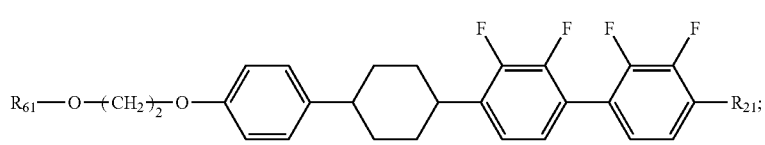
I-1-12-7
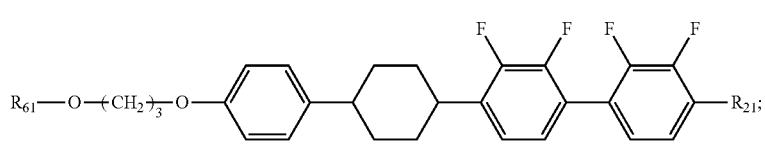
I-1-12-8
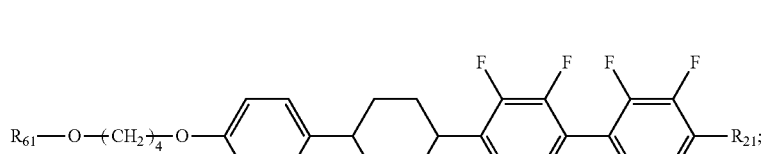
I-1-12-9
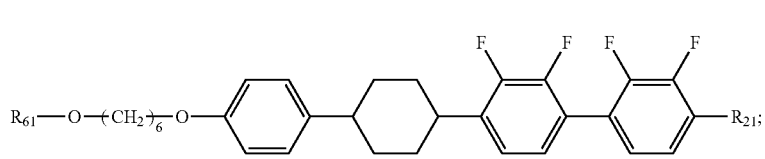
I-1-12-10
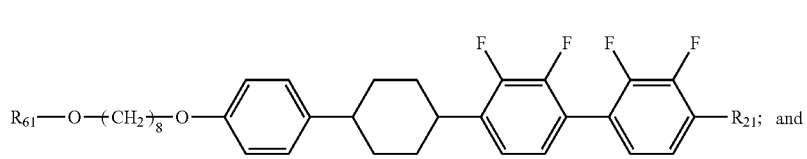
I-1-12-11 and
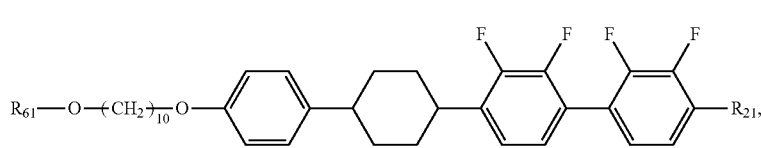
I-1-12-12
the compound of general formula I-2-1 is selected from a group consisting of the following compounds:
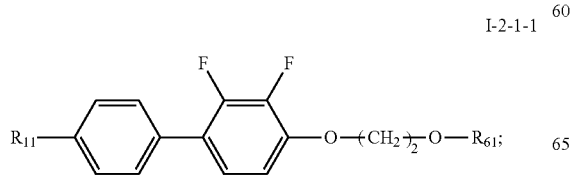
I-2-1-1
-continued
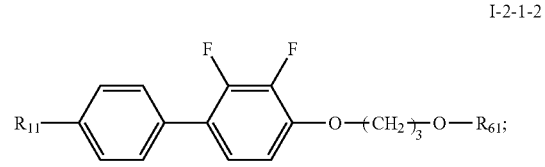
I-2-1-2

I-2-1-3
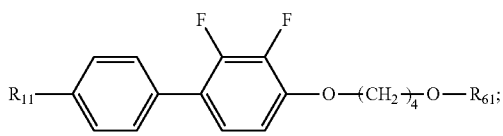
I-2-1-4
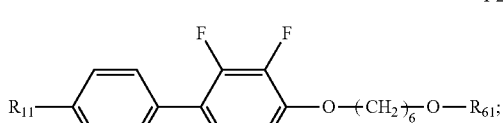
I-2-1-5
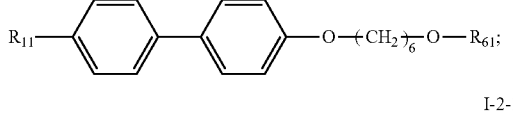
I-2-1-6
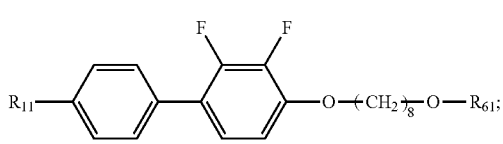
I-2-1-7
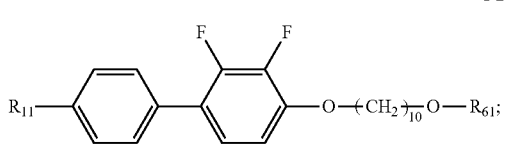
I-2-1-8
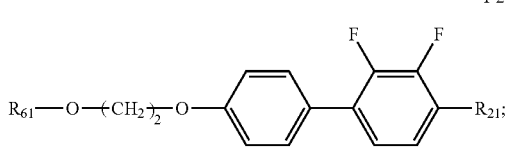
I-2-1-9
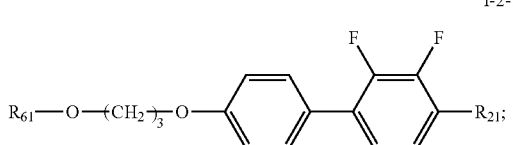
I-2-1-10
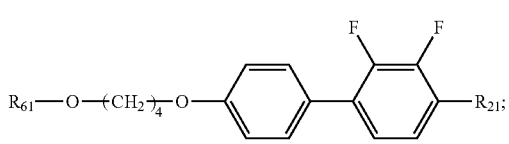
I-2-1-11
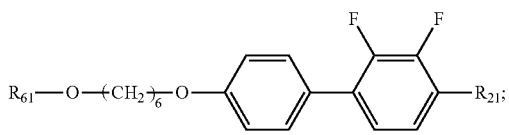; and
I-2-1-12
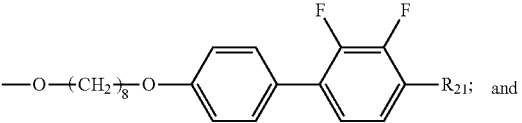,
the compound of general formula I-2-2 is selected from a group consisting of the following compounds:
I-2-2-1
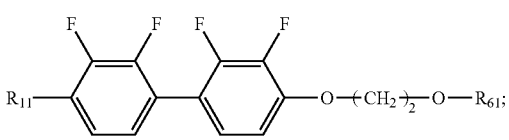
I-2-2-2
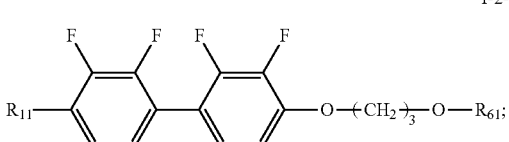
I-2-2-3
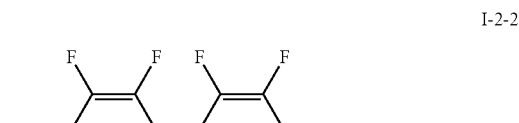
I-2-2-4
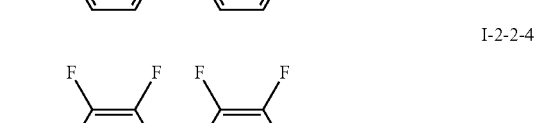
I-2-2-5
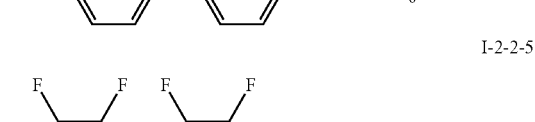; and
I-2-2-6
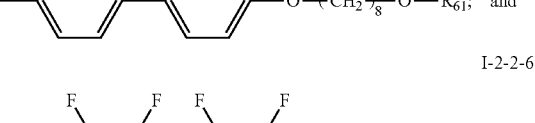,
the compound of general formula I-2-3 is selected from a group consisting of the following compounds:
I-2-3-1
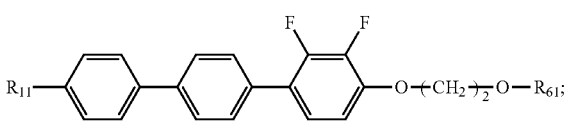
I-2-3-2
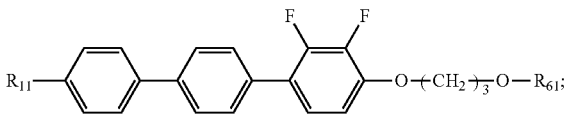
I-2-3-3
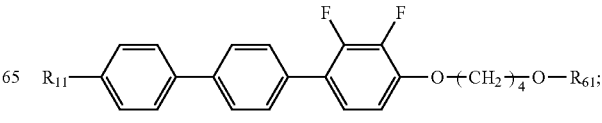

-continued
I-2-3-4
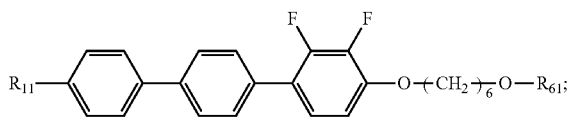
I-2-3-5
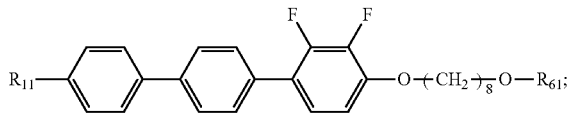
I-2-3-6
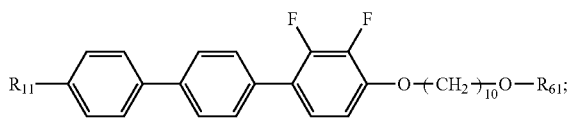
I-2-3-7
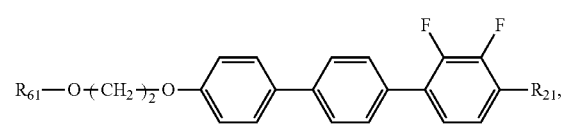
I-2-3-8
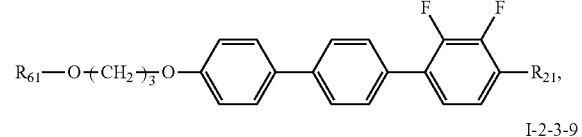
I-2-3-9
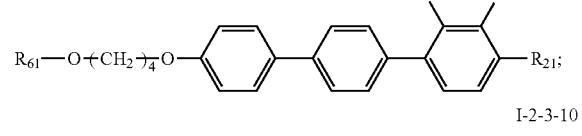
I-2-3-10
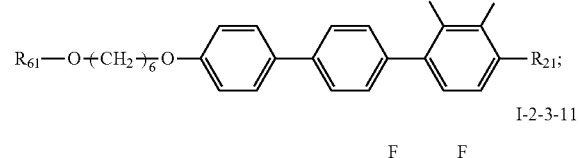
I-2-3-11
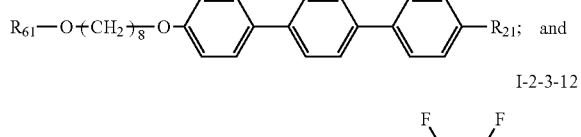
I-2-3-12
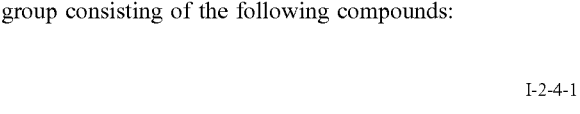
the compound of general formula I-2-4 is selected from a group consisting of the following compounds:
I-2-4-1
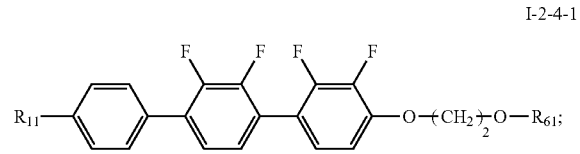
-continued
I-2-4-2
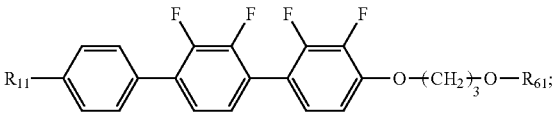
I-2-4-3
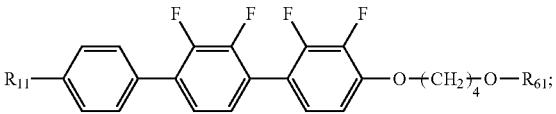
I-2-4-4
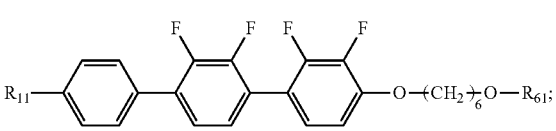
I-2-4-5
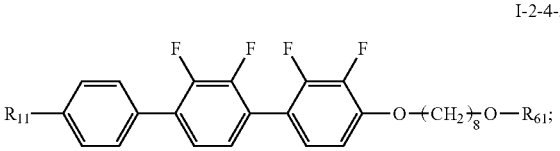
I-2-4-6
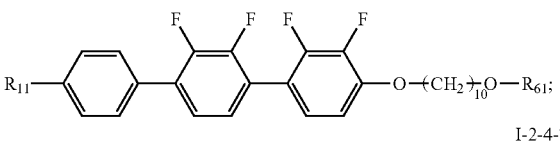
I-2-4-7
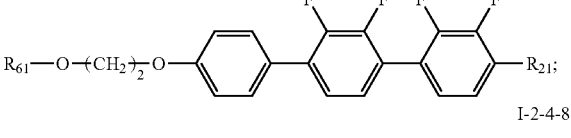
I-2-4-8
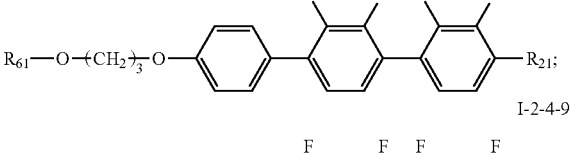
I-2-4-9
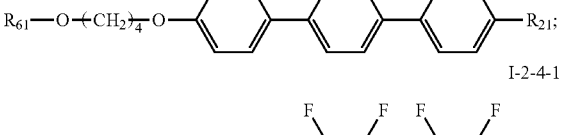
I-2-4-10
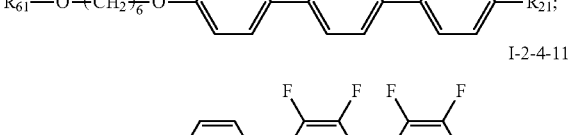
I-2-4-11
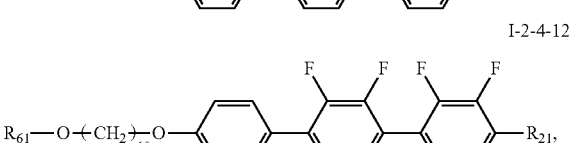
I-2-4-12 the compound of general formula I-2-5 is selected from a group consisting of the following compounds:

the compound of general formula II-2 is selected from a group consisting of the following compounds:

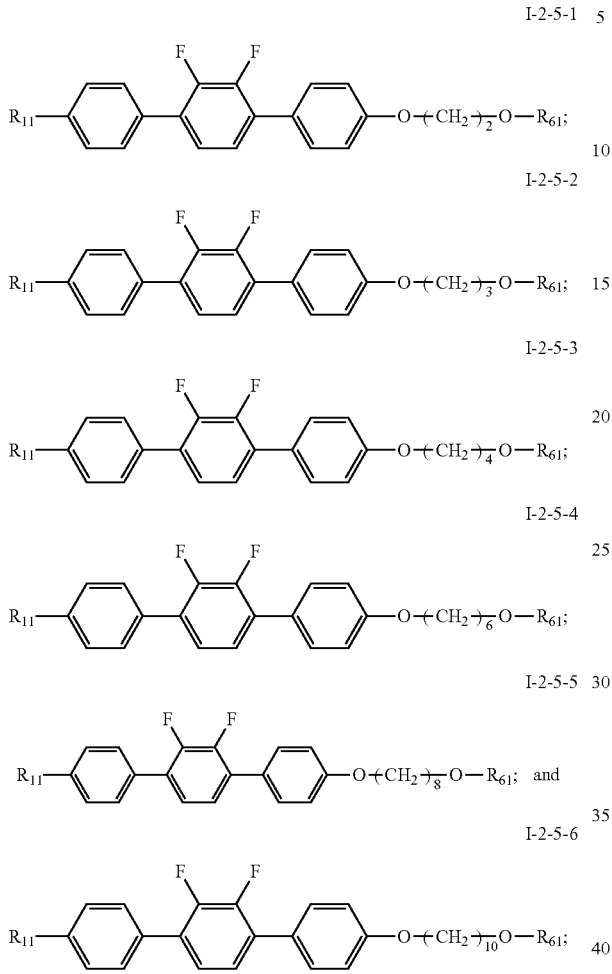

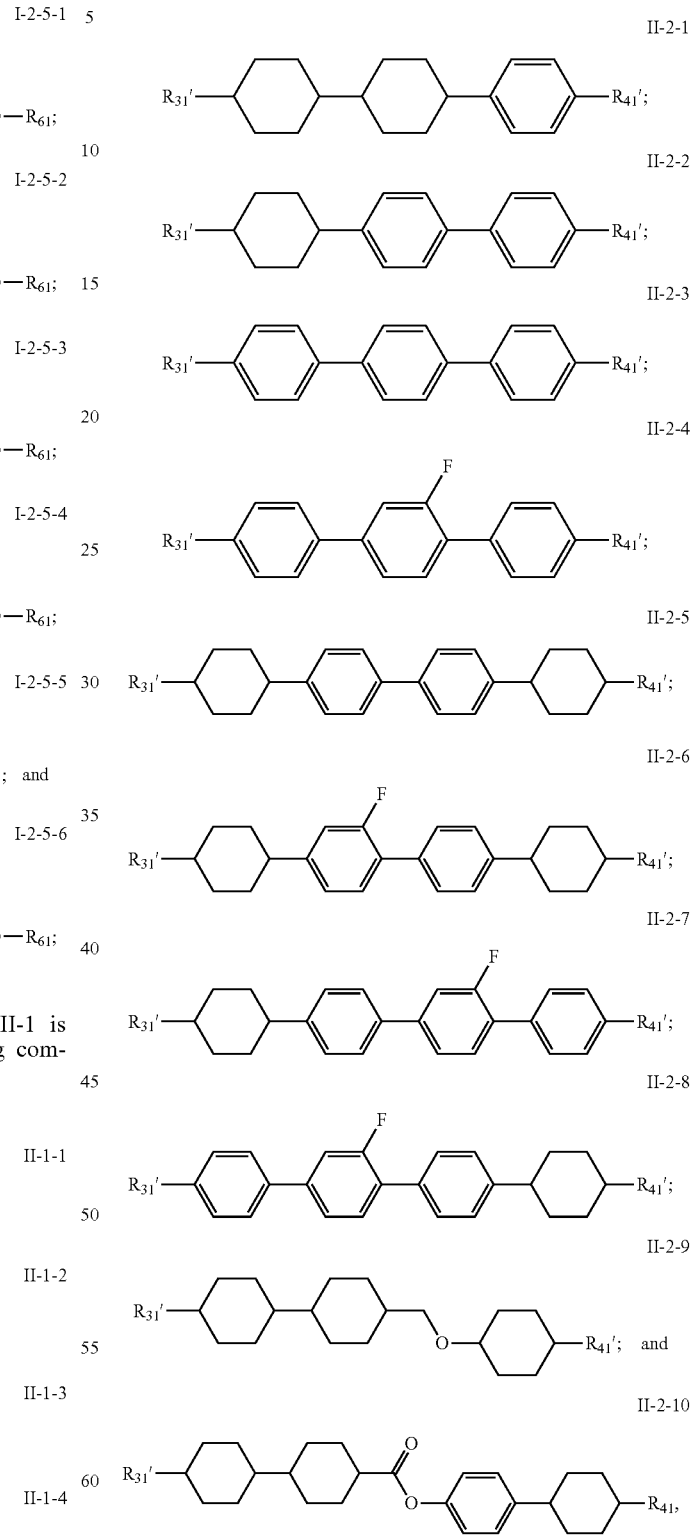

Preferably, the compound of general formula II-1 is selected from a group consisting of the following compounds:

in which, $R_{31}$, $R_{41}$, $R_{31}'$ and $R_{41}'$ each independently represents H, $C_{1-7}$ alkyl or alkoxy, or $C_{2-7}$ alkenyl or alkenoxy.

More preferably, the compound of general formula II-1 is selected from a group consisting of the following compounds:

II-1-1

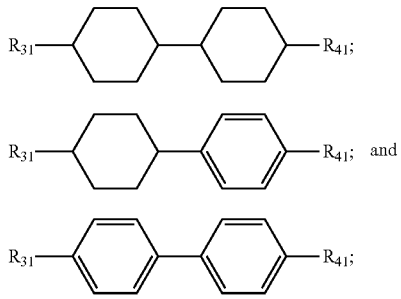

II-1-2

II-1-3 the compound of general formula II-2 is selected from a group consisting of the following compounds:

II-2-1

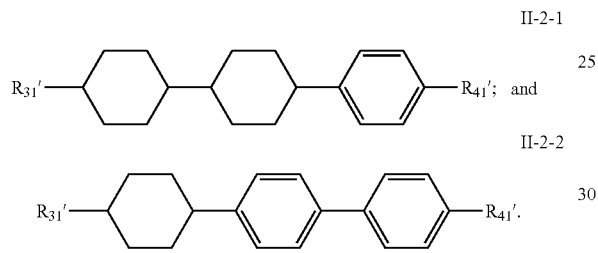

II-2-2

Preferably, the liquid crystal composition at least comprises more than 2 wt % of the compound of general formula II-2.

Preferably, the $R_5$ is —$C_3H_6$— or —$C_4H_8$—.

In some embodiments of the present invention, preferably, the compound of general formula II-1-1 is selected from a group consisting of the following compounds:

II-1-1-1
II-1-1-2
II-1-1-3
II-1-1-4
II-1-1-5
II-1-1-6

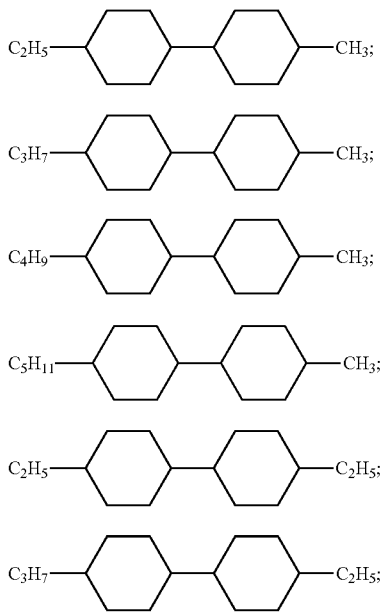

-continued

II-1-1-7
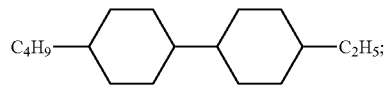

II-1-1-8
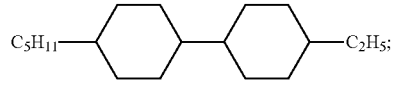

II-1-1-9
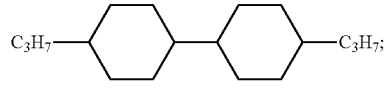

II-1-1-10
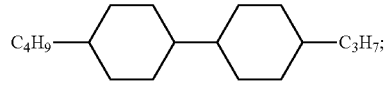

II-1-1-11
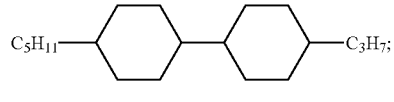

II-1-1-12
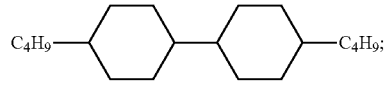

II-1-1-13
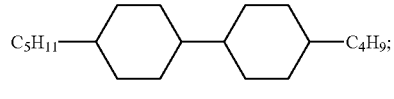

II-1-1-14
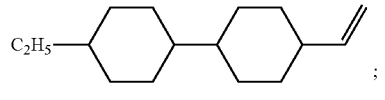

II-1-1-15
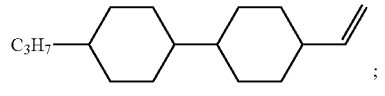

II-1-1-16
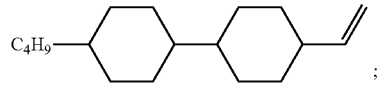

II-1-1-17
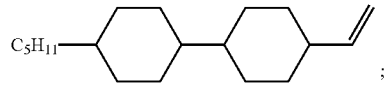

II-1-1-18
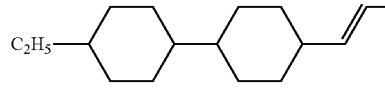

II-1-1-19
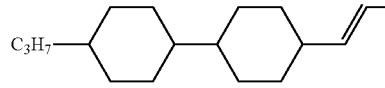

II-1-1-20
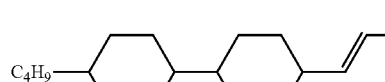

II-1-1-21
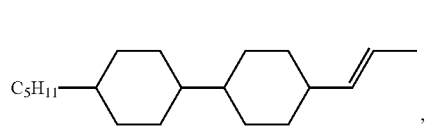

the compound of general formula II-1-2 is selected from a group consisting of the following compounds:
II-1-2-1
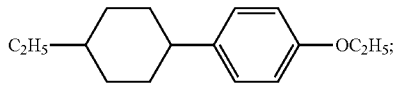
II-1-2-2
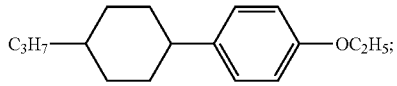
II-1-2-3
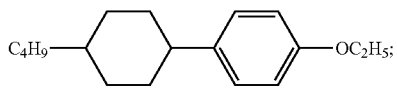
II-1-2-4
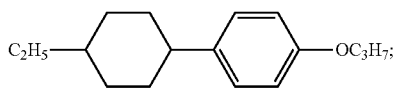
II-1-2-5
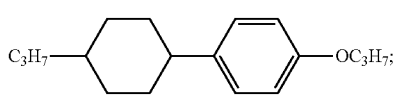
II-1-2-6
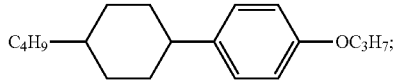
II-1-2-7
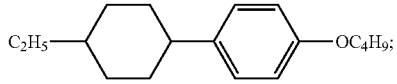
II-1-2-8
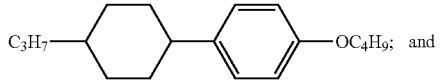 and
II-1-2-9
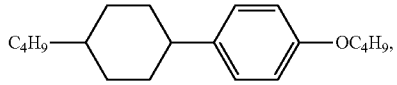
the compound of general formula II-1-3 is selected from a group consisting of the following compounds:
II-1-3-1
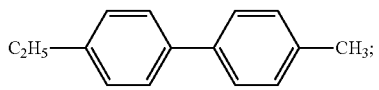
II-1-3-2
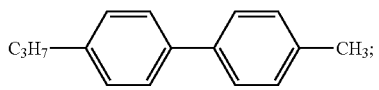
II-1-3-3
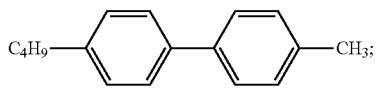
II-1-3-4
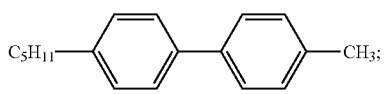
II-1-3-5
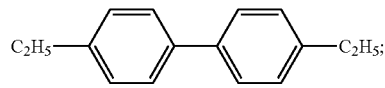
II-1-3-6
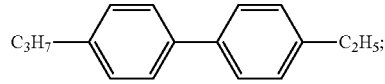
II-1-3-7
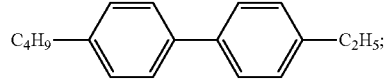
II-1-3-8
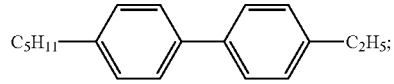
II-1-3-9
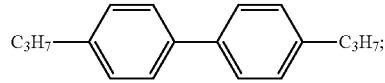
II-1-3-10
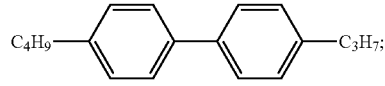
II-1-3-11
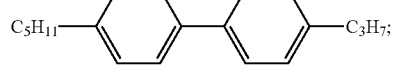
II-1-3-12
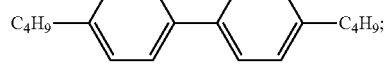
II-1-3-13
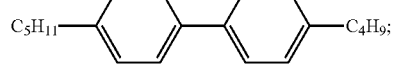
II-1-3-14
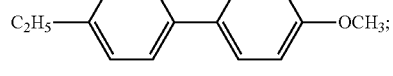
II-1-3-15
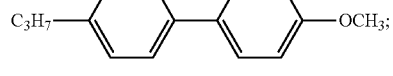
II-1-3-16
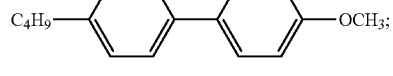
II-1-3-17
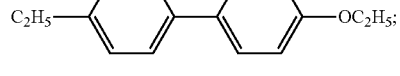
II-1-3-18
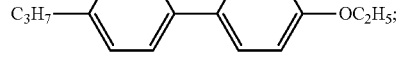
II-1-3-19
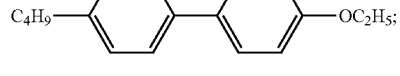
II-1-3-20
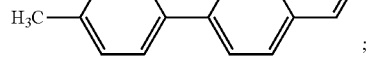

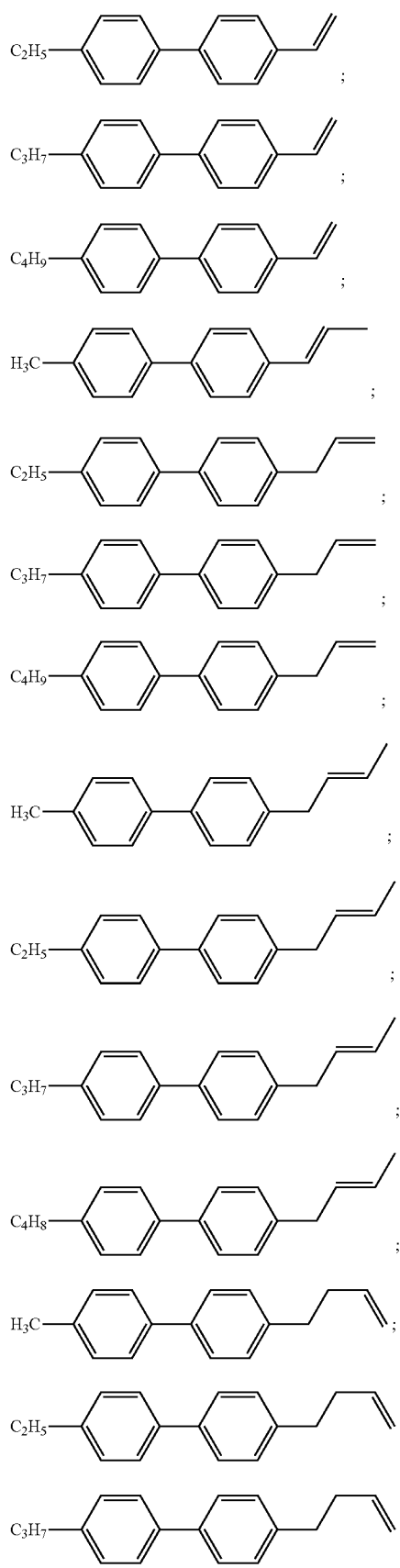
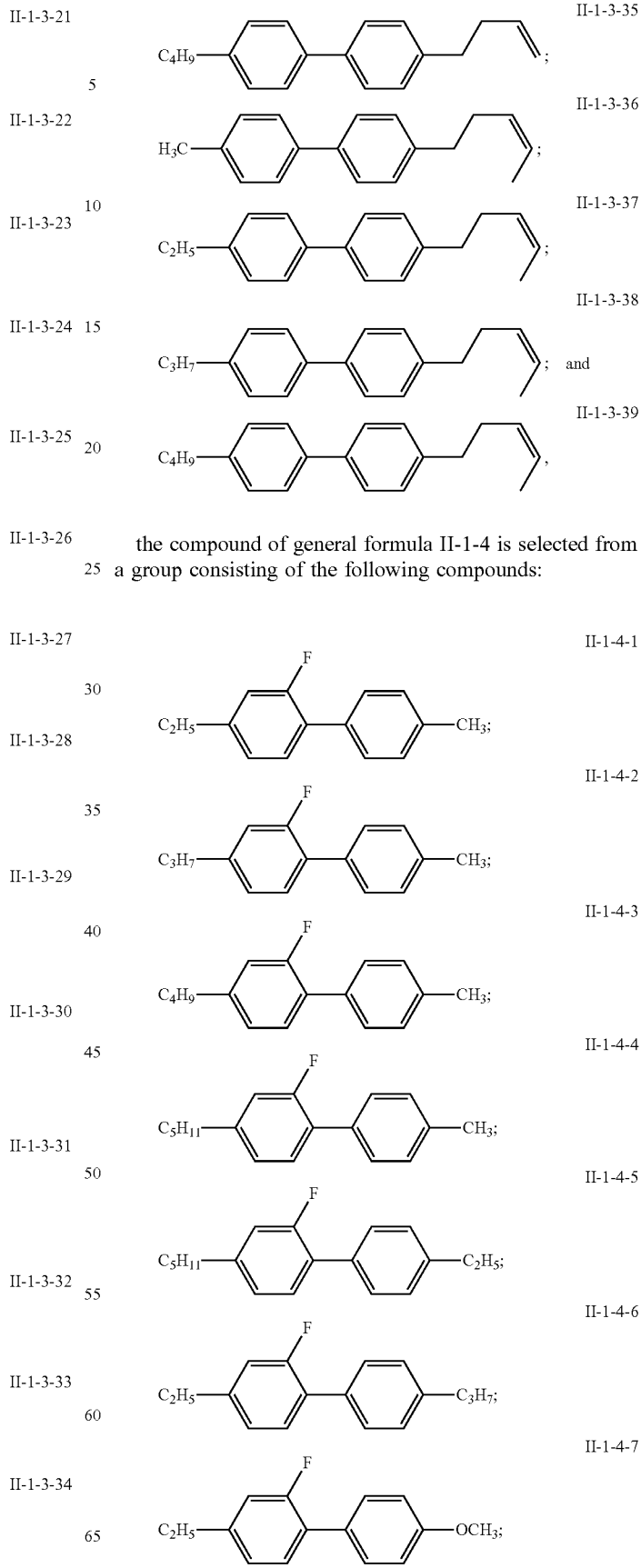
the compound of general formula II-1-4 is selected from a group consisting of the following compounds:

II-1-4-8
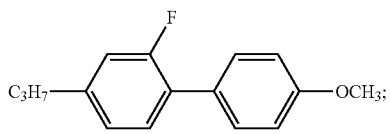
II-1-4-9
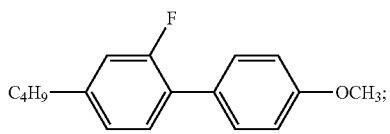
II-1-4-10
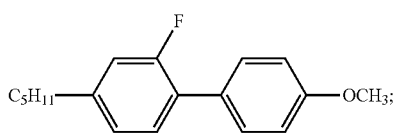
II-1-4-11
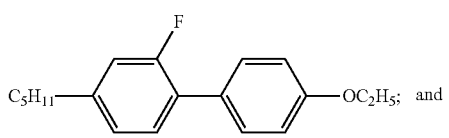 and
II-1-4-12
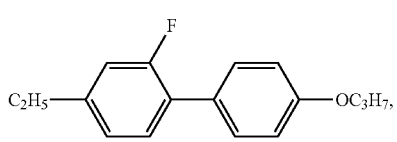
the compound of general formula II-2-1 is selected from a group consisting of the following compounds:
II-2-1-1
II-2-1-2
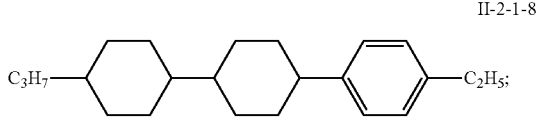
II-2-1-3
II-2-1-4
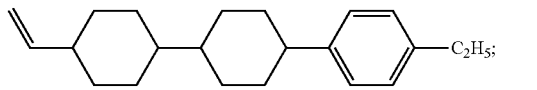
II-2-1-5
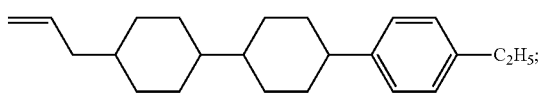
II-2-1-6
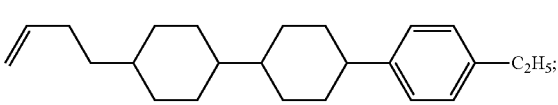
II-2-1-7
II-2-1-8
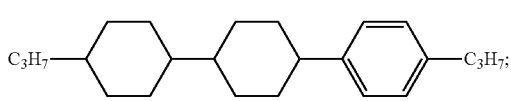
II-2-1-9
II-2-1-10
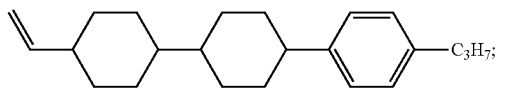
II-2-1-11
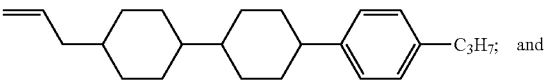
II-2-1-12
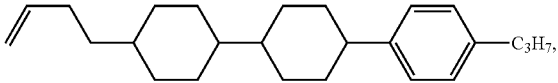
II-2-1-13
II-2-1-14
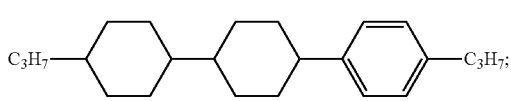
II-2-1-15
II-2-1-16
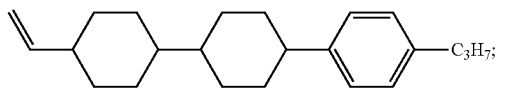
II-2-1-17
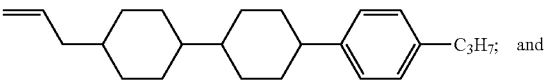 and
II-2-1-18
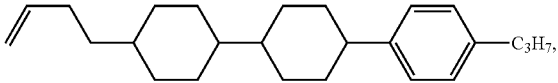

the compound of general formula II-2-2 is selected from a group consisting of the following compounds:
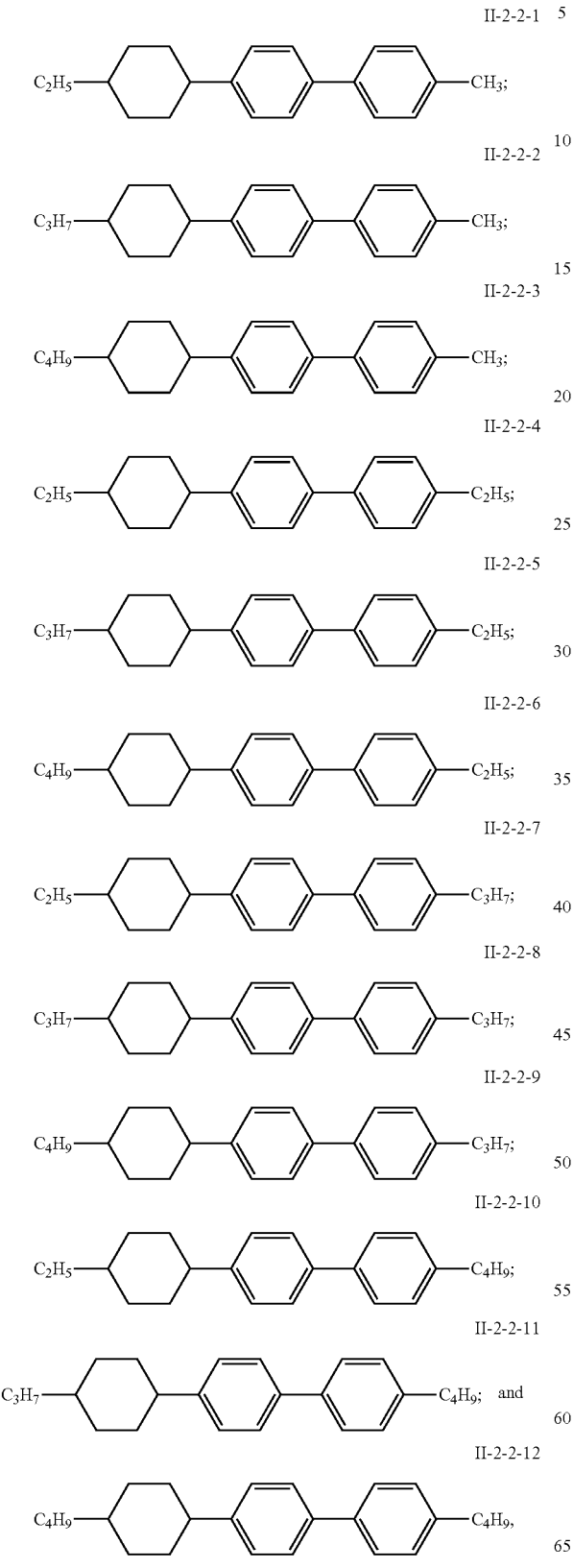
the compound of general formula II-2-3 is selected from a group consisting of the following compounds:
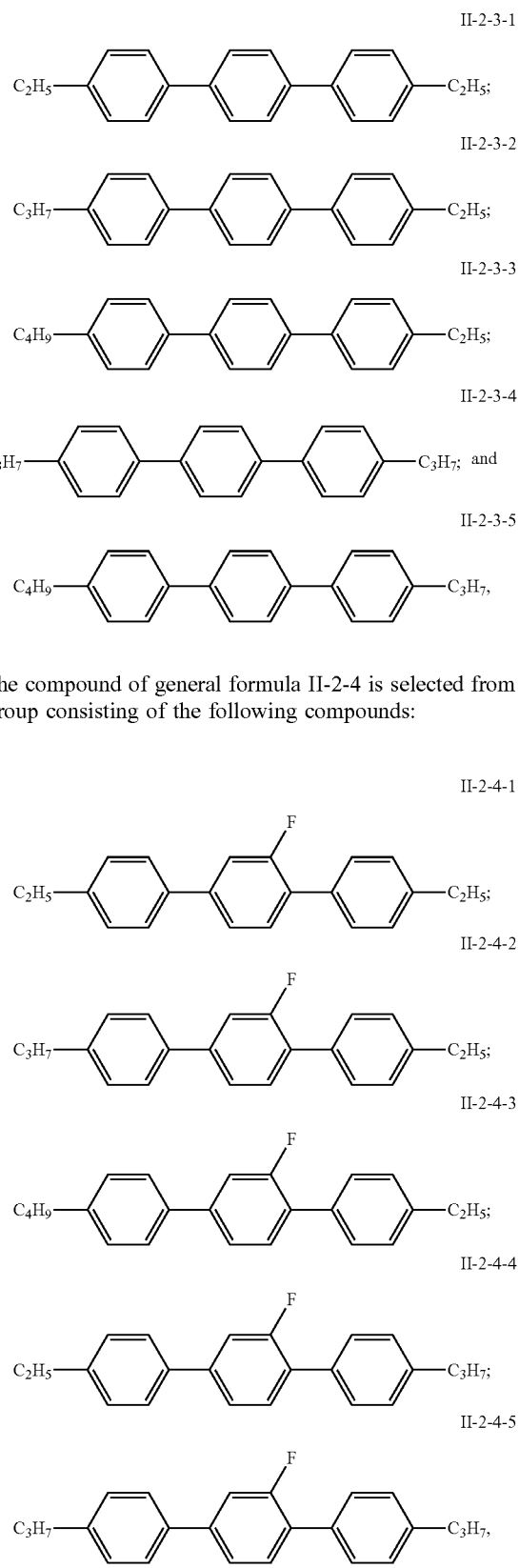
the compound of general formula II-2-4 is selected from a group consisting of the following compounds:

-continued
II-2-4-6
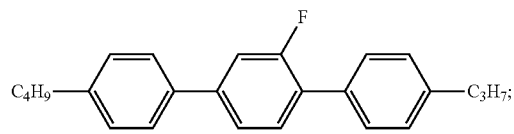
II-2-4-7
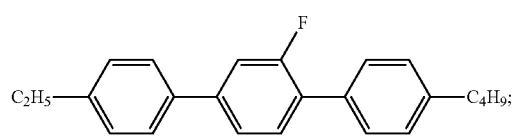
II-2-4-8
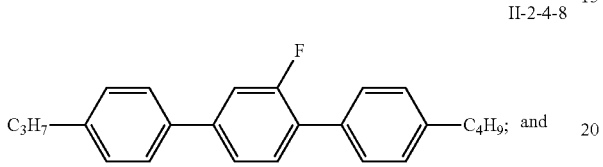
II-2-4-9
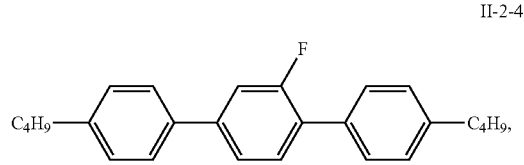
the compound of general formula II-2-5 is selected from a group consisting of the following compounds:
II-2-5-1
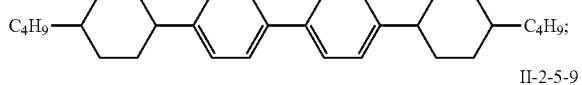
II-2-5-2
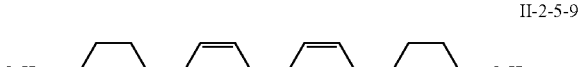
II-2-5-3
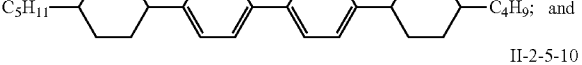
II-2-5-4
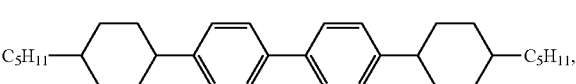
II-2-5-5
II-2-5-6
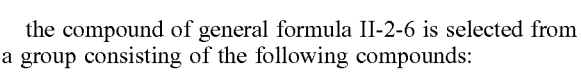
II-2-5-7
II-2-5-8
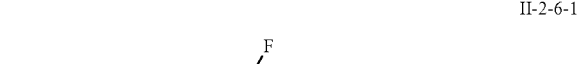
II-2-5-9
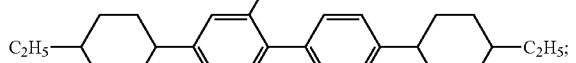
II-2-5-10
the compound of general formula II-2-6 is selected from a group consisting of the following compounds:
II-2-6-1
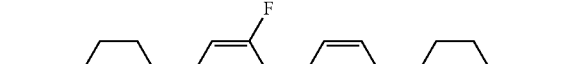
II-2-6-2
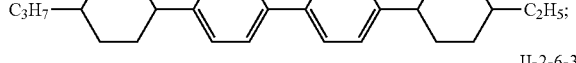
II-2-6-3
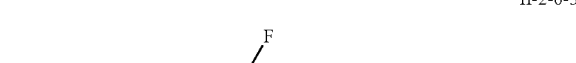
II-2-6-4
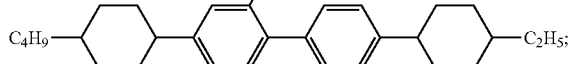
II-2-6-5
II-2-6-6
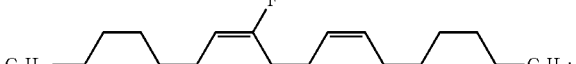
II-2-6-7
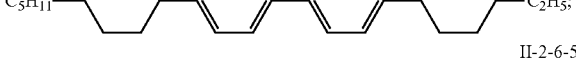
II-2-6-8
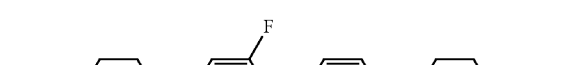

II-2-6-9
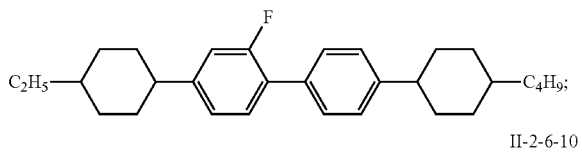
II-2-6-10
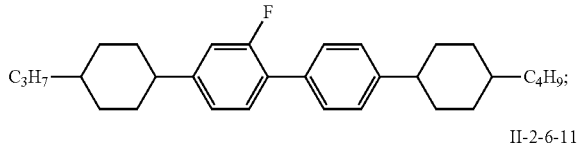
II-2-6-11
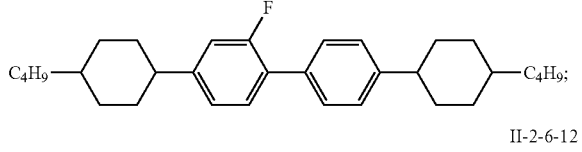
II-2-6-12
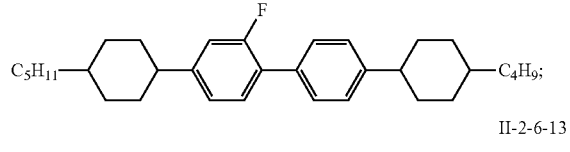
II-2-6-13
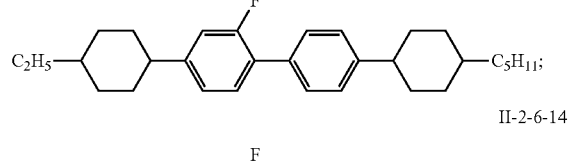
II-2-6-14
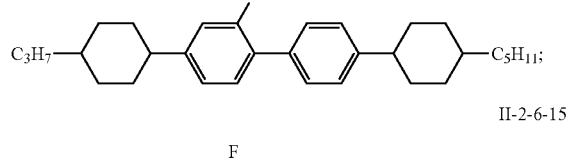
II-2-6-15
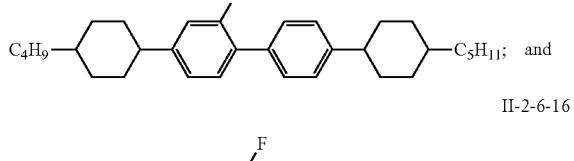; and
II-2-6-16
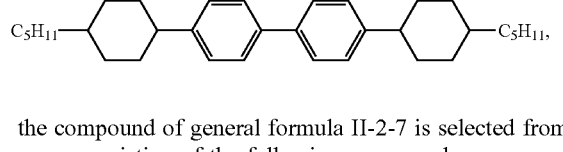,
the compound of general formula II-2-7 is selected from a group consisting of the following compounds:
II-2-7-1
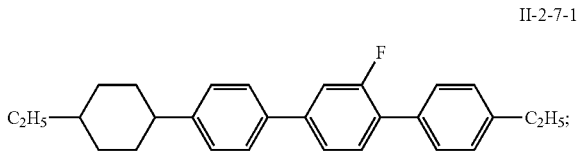
II-2-7-2
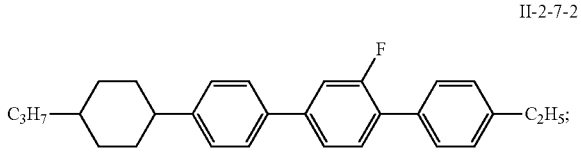
II-2-7-3
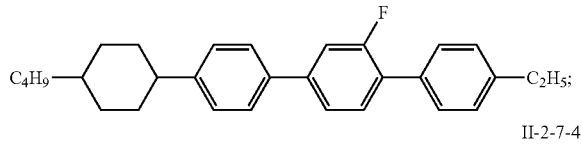
II-2-7-4
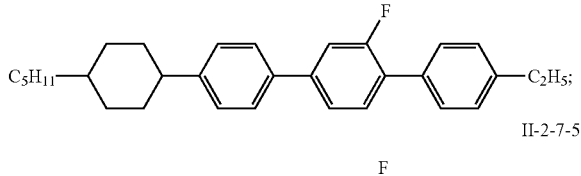
II-2-7-5
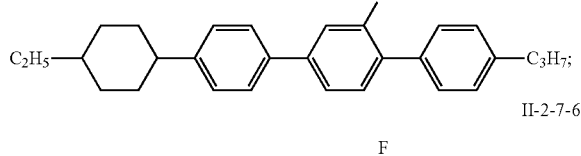
II-2-7-6
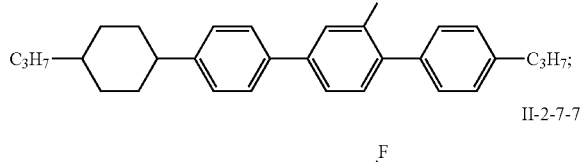
II-2-7-7
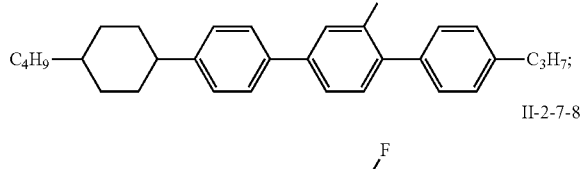
II-2-7-8
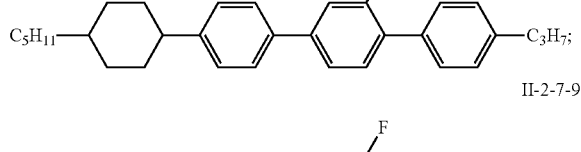
II-2-7-9
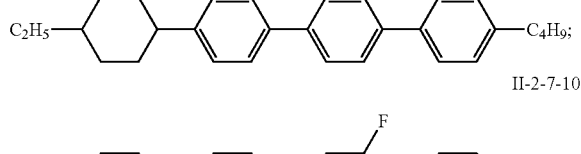
II-2-7-10
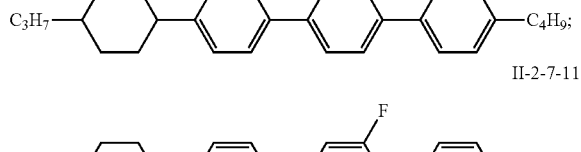
II-2-7-11
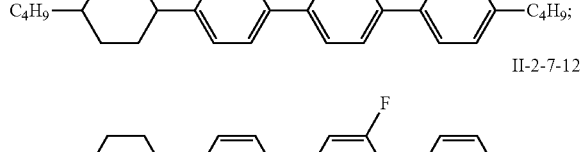
II-2-7-12
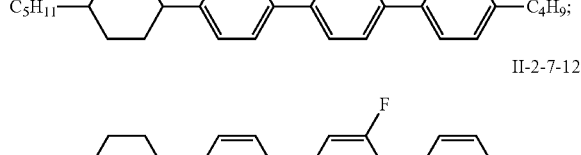
II-2-7-12

II-2-7-13
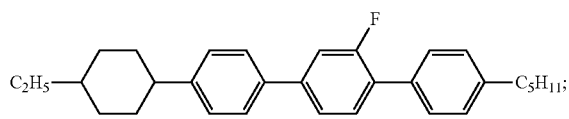
II-2-7-14
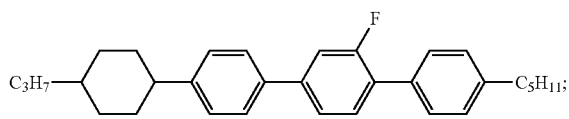
II-2-7-15
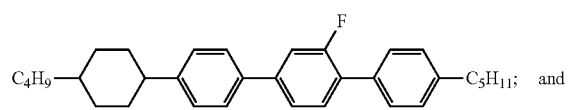 and
II-2-7-16
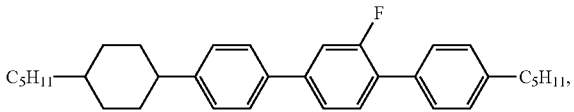
the compound of general formula II-2-8 is selected from a group consisting of the following compounds:
II-2-8-1
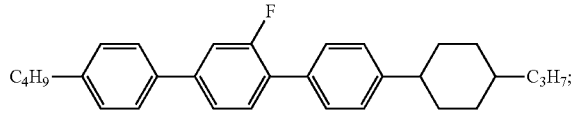
II-2-8-2
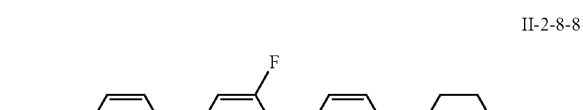
II-2-8-3
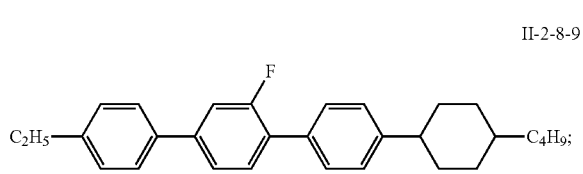
II-2-8-4
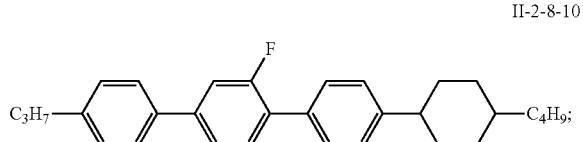
II-2-8-5
II-2-8-6
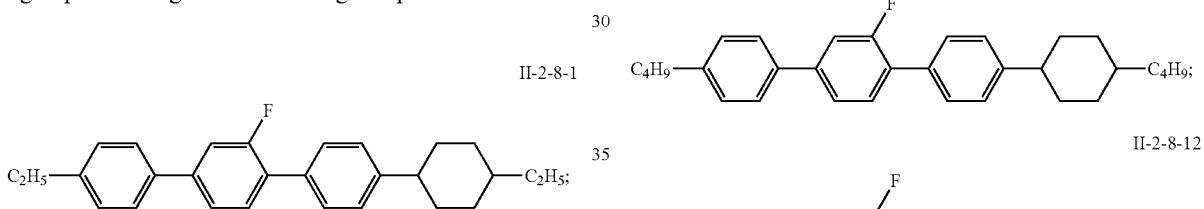
II-2-8-7
II-2-8-8
II-2-8-9
II-2-8-10
II-2-8-11
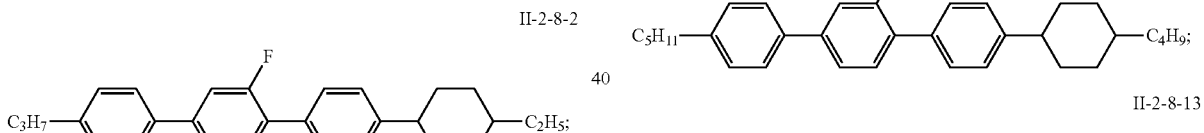
II-2-8-12
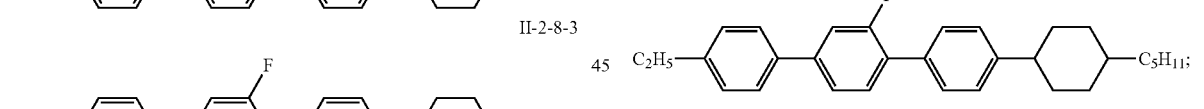
II-2-8-13
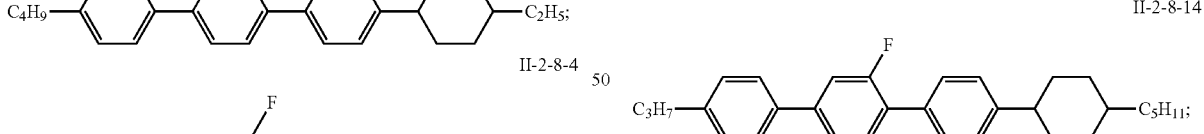
II-2-8-14
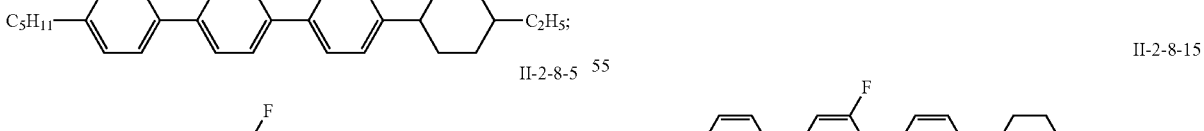
II-2-8-15
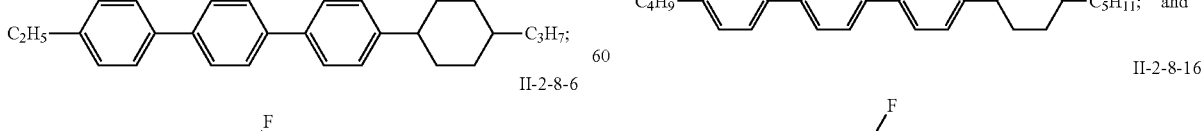 and
II-2-8-16
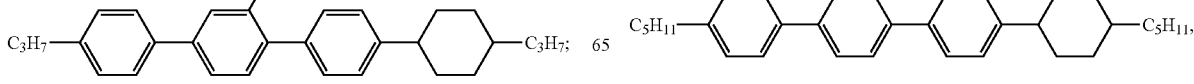

the compound of general formula II-2-9 is selected from a group consisting of the following compounds:
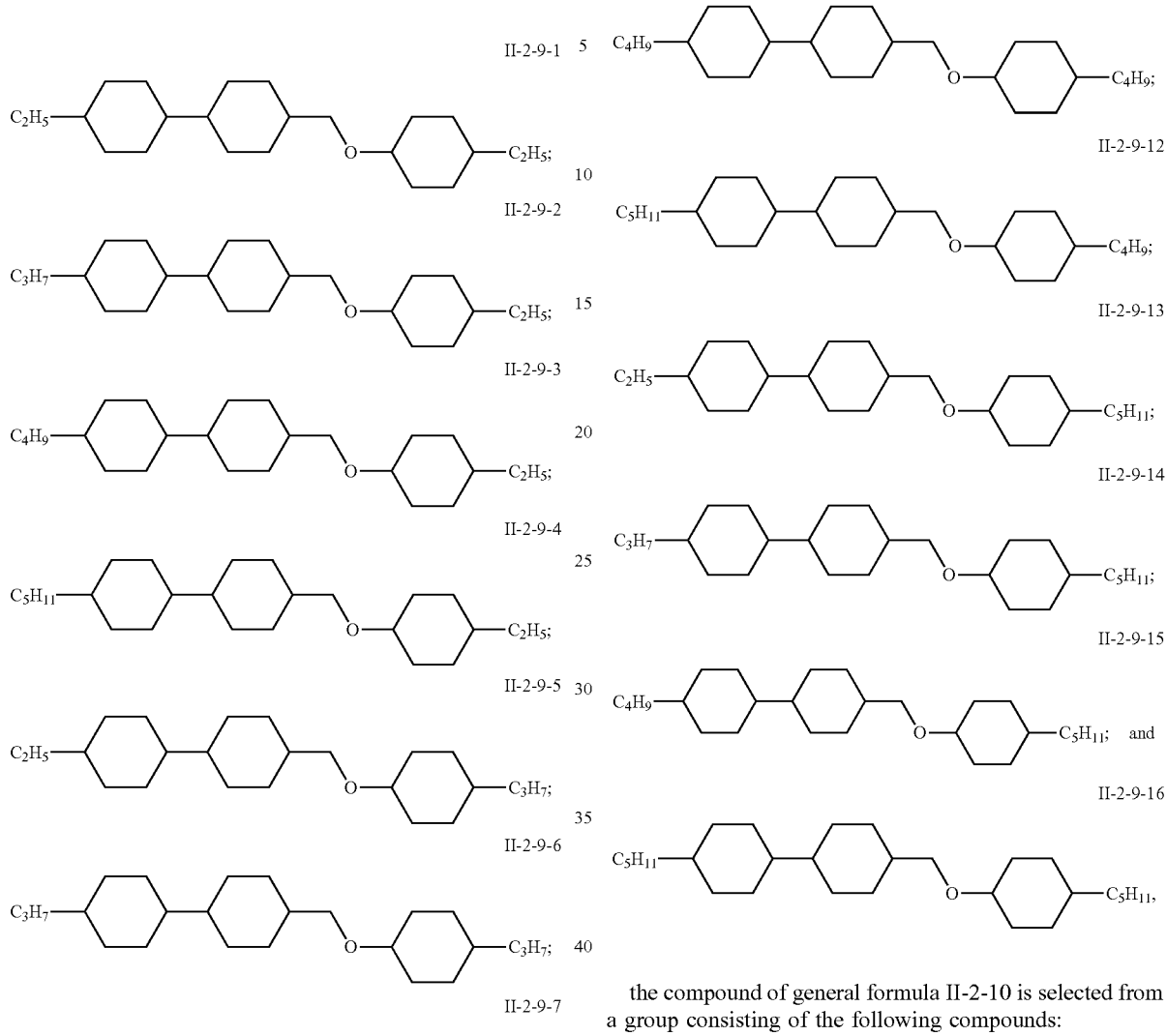
the compound of general formula II-2-10 is selected from a group consisting of the following compounds:
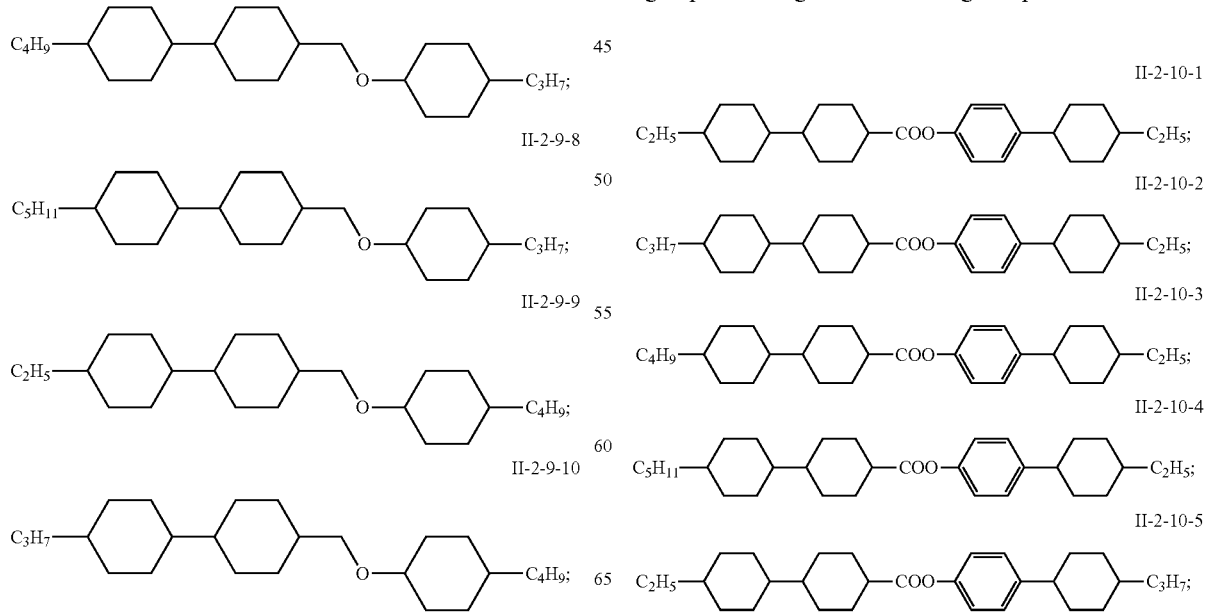

-continued

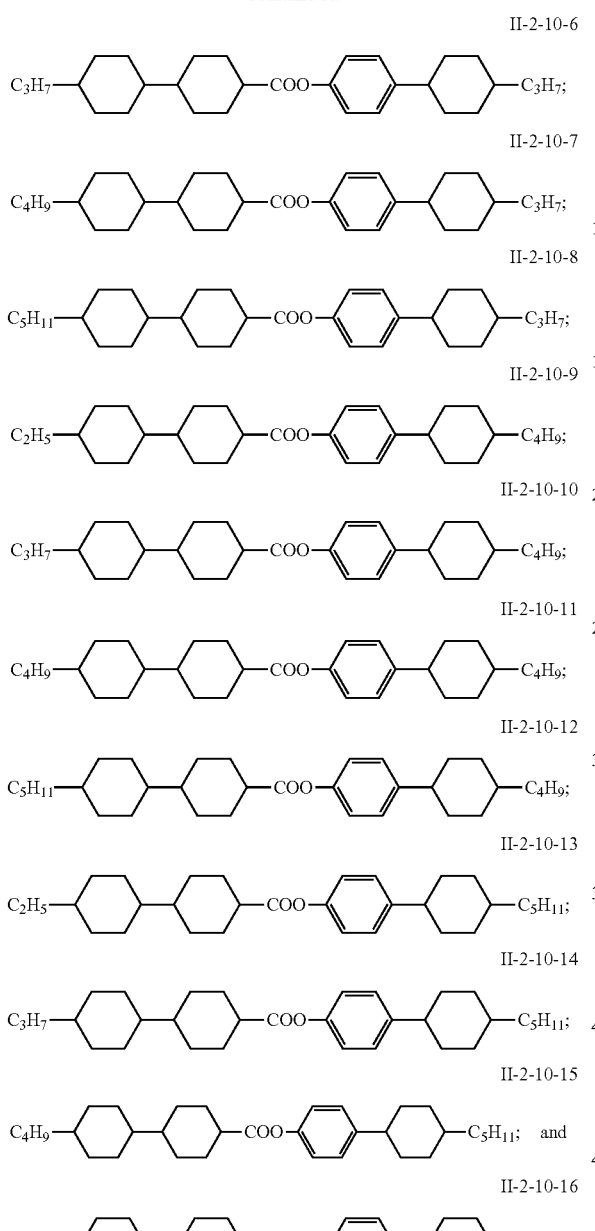

The liquid crystal composition further comprises at least one compound of general formula III

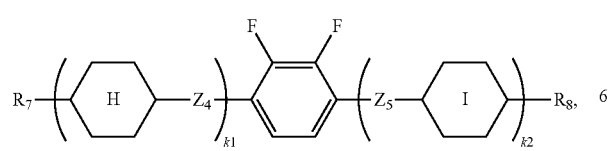

in which,

R$_7$ and R$_8$ each independently represents —H, —F, C$_{1-12}$ alkyl or alkoxy, C$_{2-12}$ alkenyl or alkenoxy,

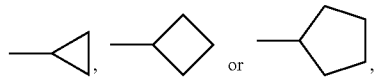

wherein one or more H on the alkyl or alkoxy and the alkenyl or alkenoxy can be substituted by F;

Z$_4$ and Z$_5$ each independently represents single bond, —COO—, —OCO—, —CH$_2$O—, —OCH$_2$— or —CH$_2$CH$_2$—;

ring

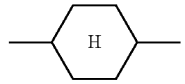

and ring

each independently represents

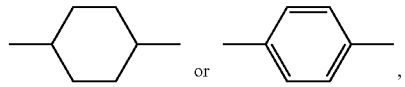

wherein one or more —CH$_2$— in

can be replaced by —O—, one or more H on

can be substituted by halogen;

k1 and k2 each independently represents 0, 1, 2 or 3, and when k1 is 2 or 3, ring

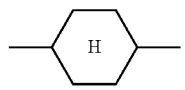

can be same or different, Z$_4$ can be same or different; when k2 is 2 or 3, ring

can be same or different, Z$_5$ can be same or different.

Preferably, the compound of general formula III is selected from a group consisting of the following compounds:

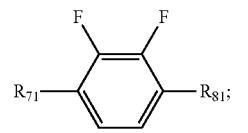
III-1

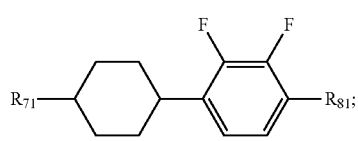
III-2

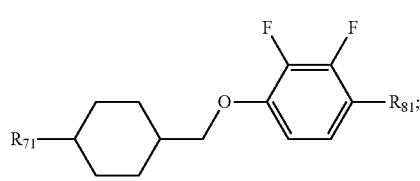
III-3

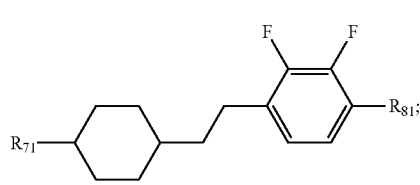
III-4

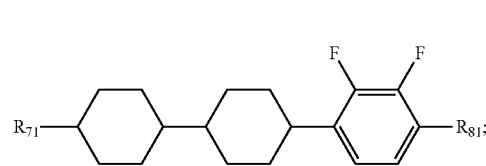
III-5

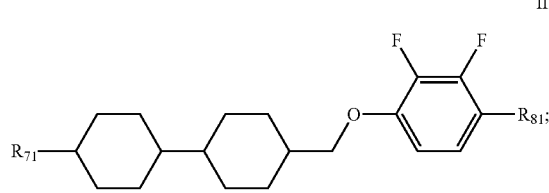
III-6

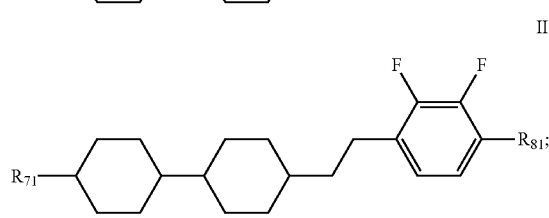
III-7

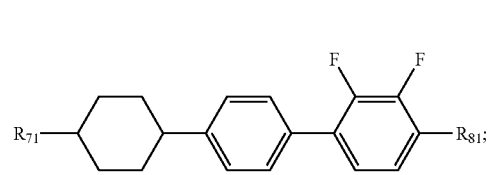
III-8

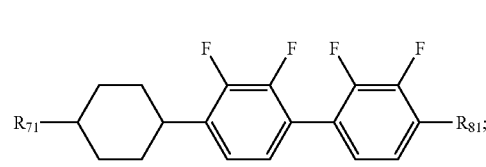
III-9

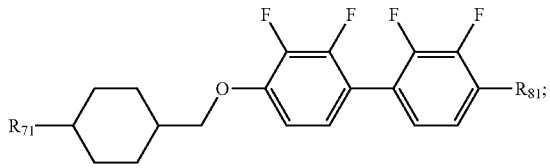
III-10

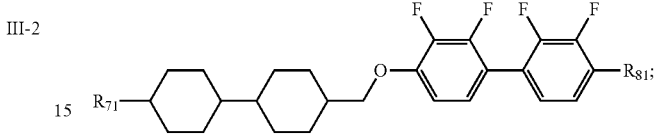
III-11

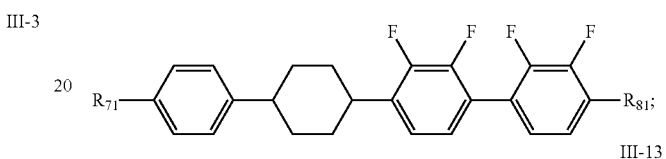
III-12

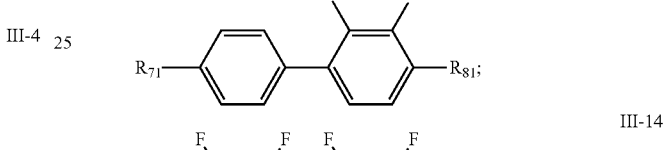
III-13

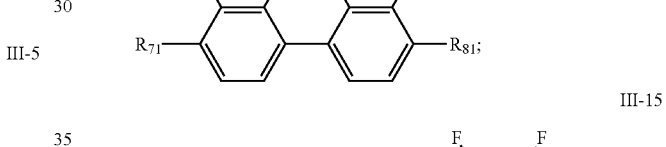
III-14

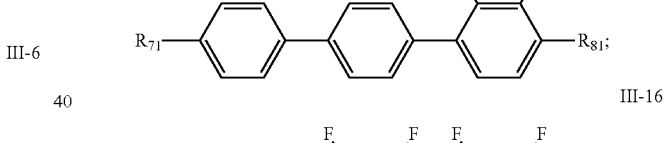
III-15

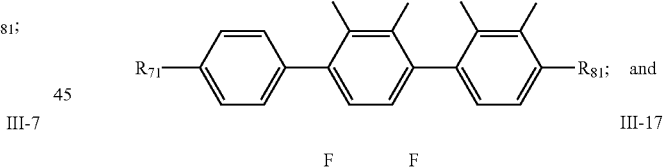
III-16 and

III-17 in which, $R_{71}$ and $R_{81}$ each independently represents —H, —F, $C_{1-7}$ alkyl or alkoxy, $C_{2-7}$ alkenyl or alkenoxy,

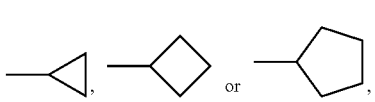

wherein one or more H on the alkyl or alkoxy and the alkenyl or alkenoxy can be substituted by F.

In some embodiments of the present invention, the compound of general formula I provides 1-60% of the total weight of the liquid crystal composition, the compound selected from a group consisting of the compounds of general formula II-1 and general formula II-2 provides 1-55% of the total weight of the liquid crystal composition, and the compound of general formula III provides 0-60% of the total weight of the liquid crystal composition.

Further, in some embodiments of the present invention, the compound of general formula I provides 1-50% of the total weight of the liquid crystal composition, the compound selected from a group consisting of the compounds of general formula II-1 and general formula II-2 provides 1-55% of the total weight of the liquid crystal composition, and the compound of general formula III provides 0-55% of the total weight of the liquid crystal composition.

Still further, in some embodiments of the present invention, the compound of general formula I provides 1-50% of the total weight of the liquid crystal composition, the compound selected from a group consisting of the compounds of general formula II-1 and general formula II-2 provides 1-50% of the total weight of the liquid crystal composition, and the compound of general formula III provides 1-50% of the total weight of the liquid crystal composition.

In another aspect, the present invention provides a liquid crystal composition which also comprises one or more additives known to those skilled in the art and described in the literatures. For example, polychromatic dye and/or chiral dopant can be added in an amount of 0-15% by weight, based on the total weight of the liquid crystal composition.

Dopants which can be preferably added to the mixture according to the present invention are shown below.

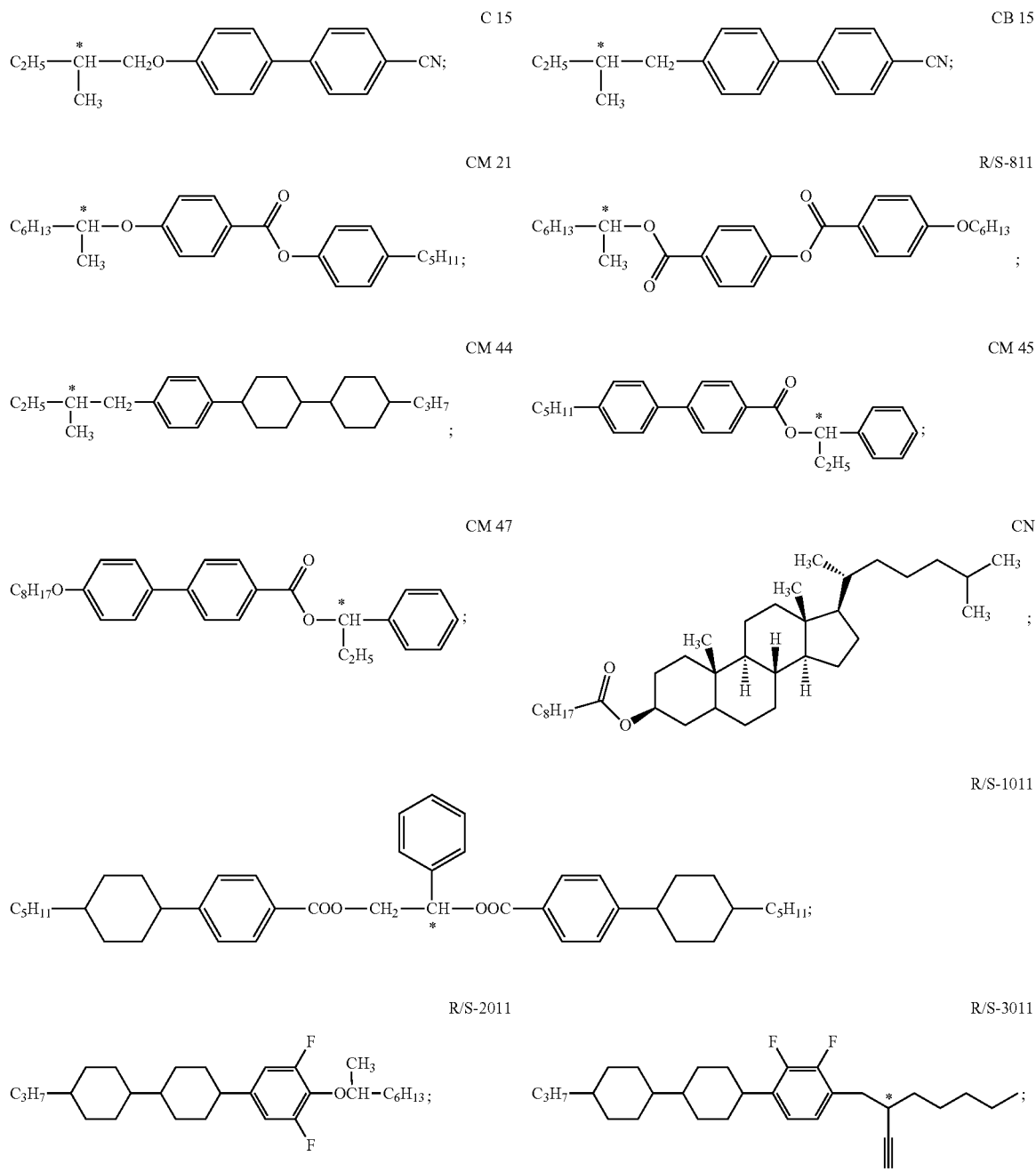

-continued
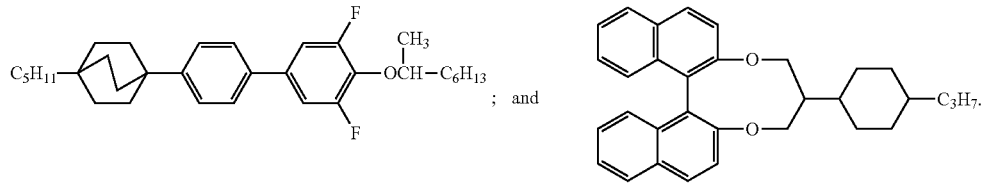
R/S-4011 ; and R/S-5011
In an embodiment of the present invention, preferably, the dopant provides 0-5% of the total weight of the liquid crystal composition; more preferably, the dopant provides 0-1% of the total weight of the liquid crystal composition.
Stabilizers which can be added, for example, to the mixture according to the present invention are mentioned below.
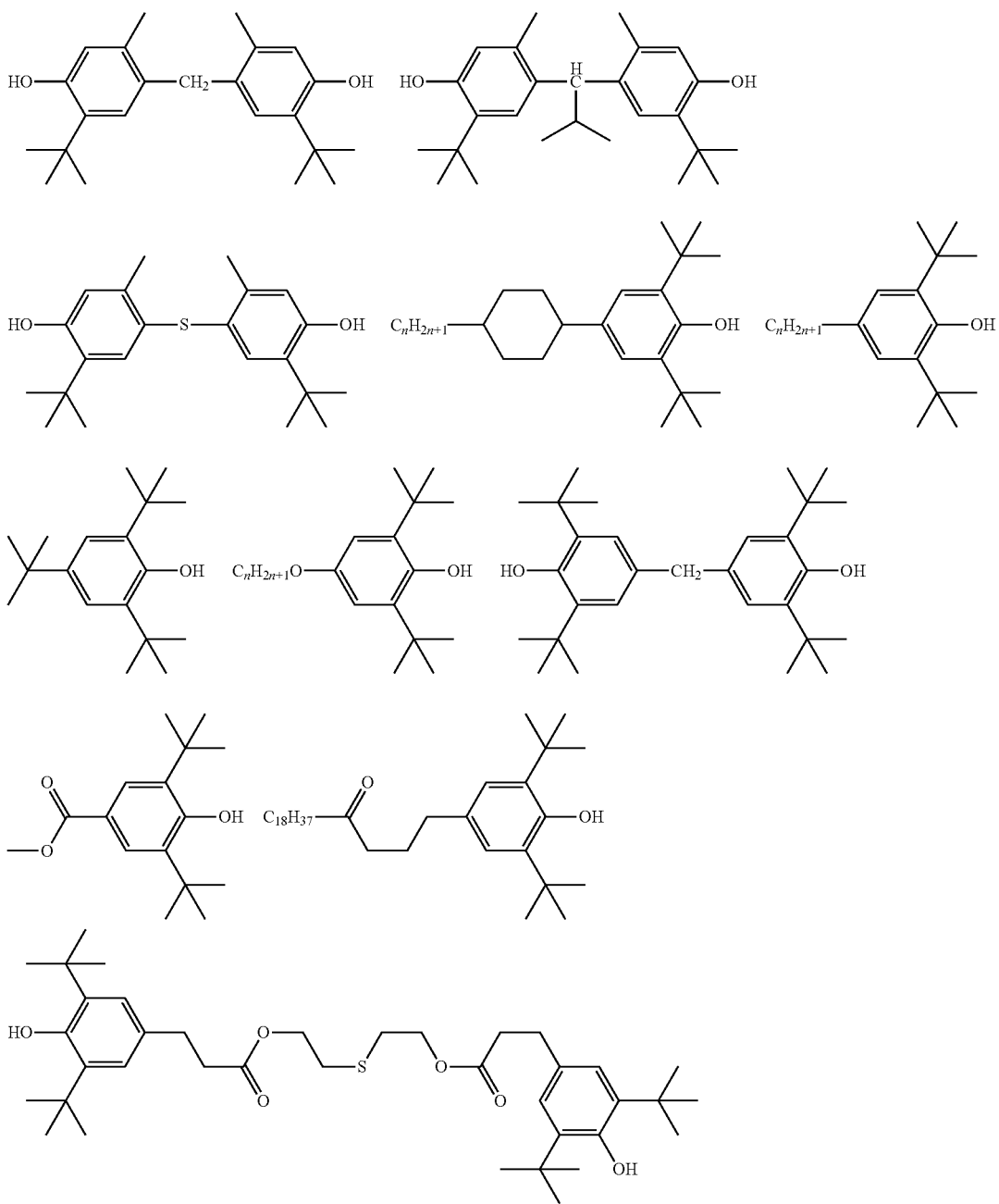

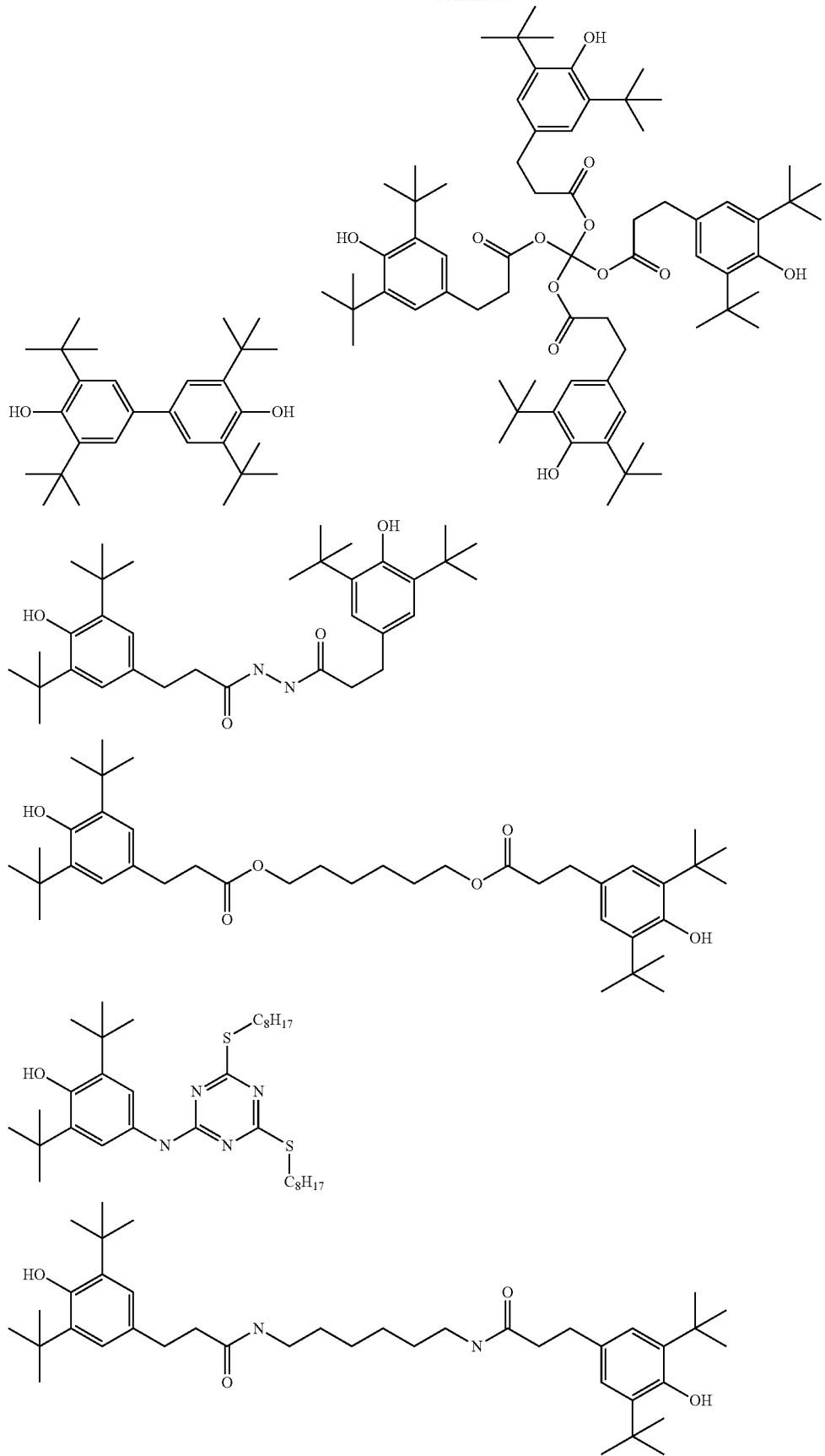

-continued
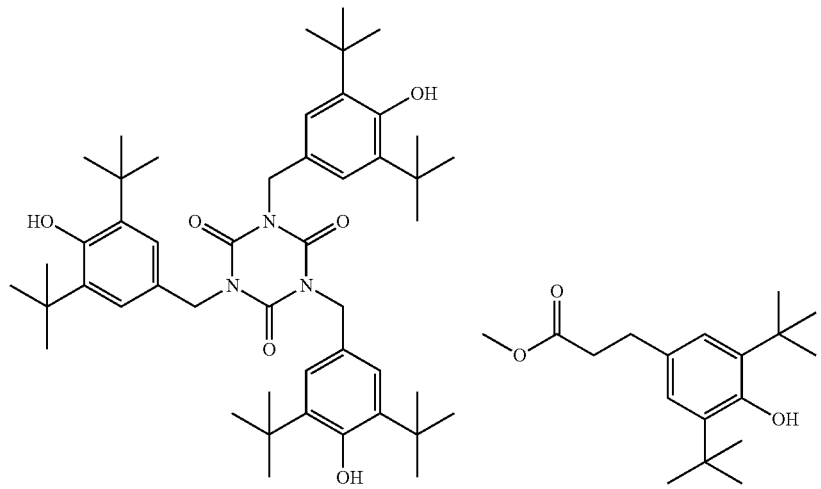
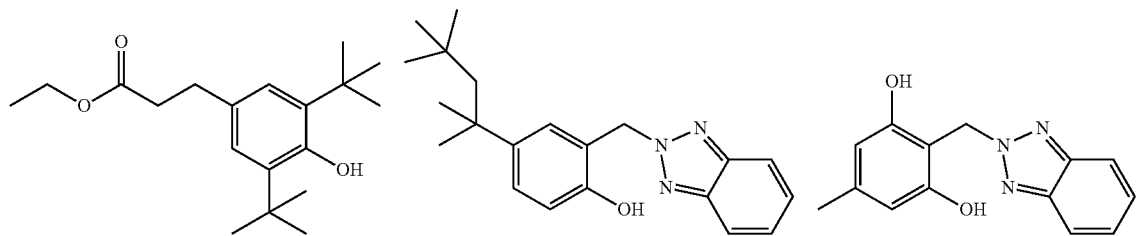
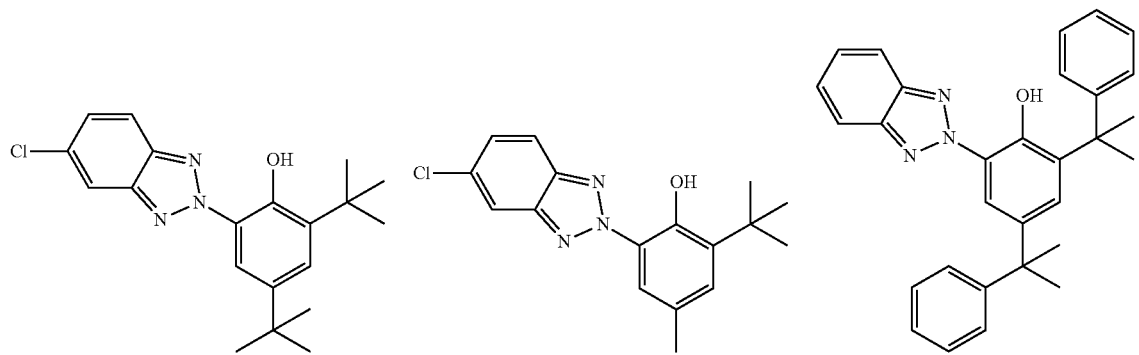
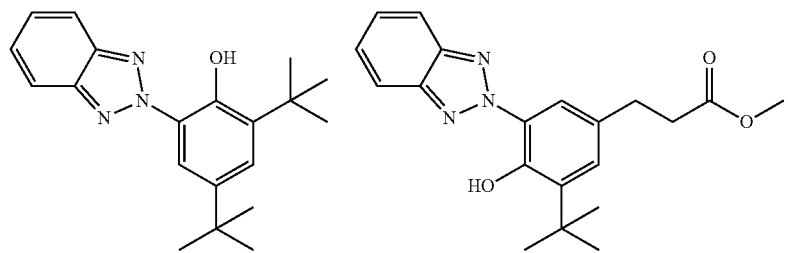

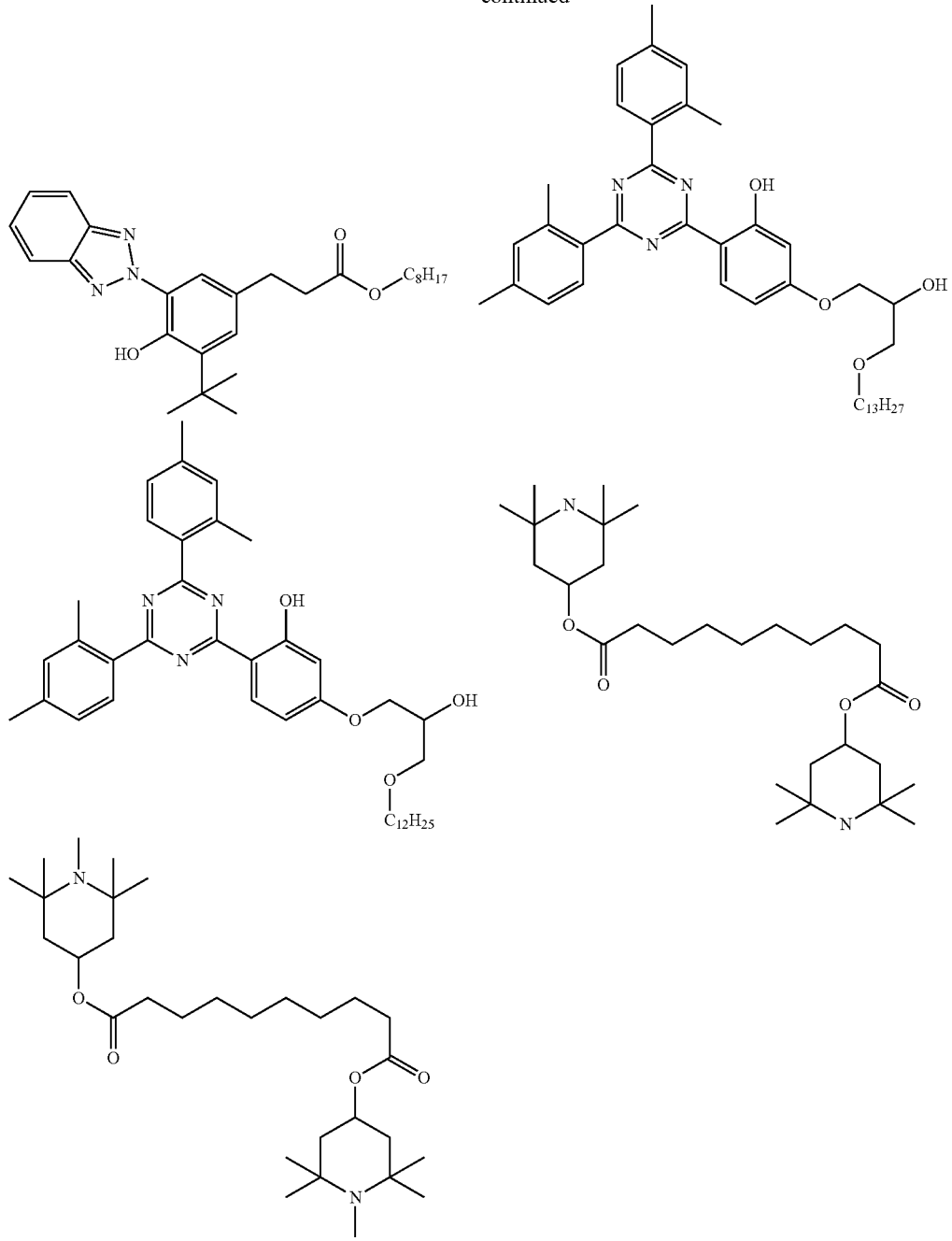
Preferably, the stabilizer is selected from stabilizers as shown below.
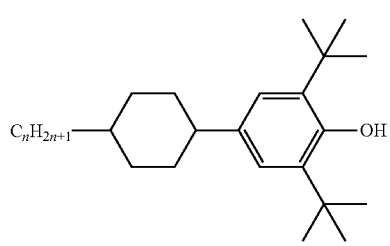
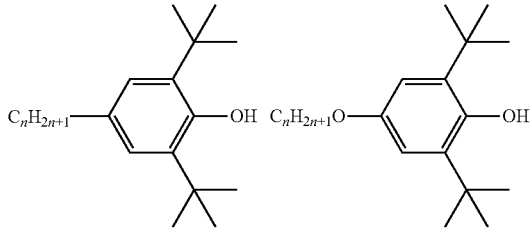
In the embodiments of the present invention, preferably, the stabilizer provides 0-5% of the total weight of the liquid crystal composition; more preferably, the stabilizer provides 0-1% of the total weight of the liquid crystal composition; as a particularly preferred embodiment, the stabilizer provides 0-0.1% of the total weight of the liquid crystal composition.

In still another aspect, the present invention further provides a liquid crystal display device comprising the above liquid crystal composition.

Beneficial Effects

The liquid crystal composition provided by the present invention has suitable optical anisotropy, high clearing point, high elastic constants $K_{11}$ and $K_{33}$, and relatively low dielectric anisotropy. When the liquid crystal composition is applied to a liquid crystal display device, the liquid crystal display device may have better weather resistance and higher contrast ratio.

DETAILED EMBODIMENTS

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

For the convenience of the expression, the group structures of the liquid crystal compositions in the following Examples are represented by the codes listed in Table 1:

TABLE 1

| Codes of the group structures of liquid crystal compounds | | |
|---|---|---|
| Unit structure of group | Code | Name of group |
| ⬡ | C | 1,4-cyclohexylidene |
| ⬡ | P | 1,4-phenylene |
| ⬡-F | G | 2-fluoro-1,4-phenylene |
| F-⬡-F | U | 2,5-difluoro-1,4-phenylene |
| F,F-⬡ | W | 2,3-difluoro-1,4-phenylene |
| (indan) | I | indan-2,5-diyl |

TABLE 1-continued

| Codes of the group structures of liquid crystal compounds | | |
|---|---|---|
| Unit structure of group | Code | Name of group |
| —CH$_2$CH$_2$— | 2 | ethyl bridge bond |
| —OCF$_3$ | OCF3 | trifluoromethoxy |
| —F | F | fluorine substituent |
| —O— | O | oxygen substituent |
| —CF$_2$O— | 1(2F)O | difluoro ether group |
| —COO— | E | ester bridge bond |
| —C$_n$H$_{2n+1}$ or —C$_m$H$_{2m+1}$ | n or m | alkyl |
| —CH=CH— or —CH=CH$_2$ | V | alkenyl |

Take a compound with the following structural formula as an example:

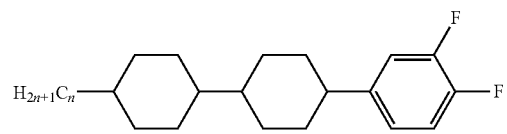

Represented by the codes listed in Table 1, this structural formula can be expressed as nCCGF, in which, n in the code represents the number of the carbon atoms of the alkyl on the left, for example, n is "3", meaning that the alkyl is —C$_3$H$_7$; C in the code represents cyclohexyl, G represents 2-fluoro-1,4-phenylene, and F represents fluoro.

The abbreviated codes of the test items in the following Examples are as follows:

Cp (° C.)    clearing point (nematic-isotropy phases transition temperature)
Δn    optical anisotropy (589 nm, 25° C.)
Δε    dielectric anisotropy (1 KHz, 25° C.)
t-40° C.    storage time at low temperature (at -40° C.)
$K_{11}$    splay elastic constant
$K_{33}$    bend elastic constant In which,
the optical anisotropy is tested using abbe refractometer under sodium lamp (589 nm) light source at 25° C.;
$\Delta\varepsilon=\varepsilon_\parallel-\varepsilon_\perp$, in which, $\varepsilon_\parallel$ is a dielectric constant parallel to the molecular axis, $\varepsilon_\perp$ is a dielectric constant perpendicular to the molecular axis, with the test conditions: 25° C., 1 KHz, TN90 type test cell with a cell gap of 7 μm.
$K_{11}$, $K_{33}$ are calculated by C-V curve of liquid crystal tested by LCR meter and anti-parallel rubbing cell; test conditions: 7 m anti-parallel rubbing cell, V=0.1~20 V.

The ingredients used in the following Examples can be synthesized by well-known methods or obtained by commercial means. These synthetic techniques are routine, and the test results show that the liquid crystal compounds thus prepared meet the criteria for the electronic compounds.

Several liquid crystal compositions are prepared according to the formulations of the liquid crystal compositions specified in the following Examples. The preparation of the liquid crystal compositions is proceeded according to the conventional methods in the art, and as an example, the compositions are prepared by mixing the specified formulation via the processing modes, such as heating, ultrasonic processing, suspending processing and so forth.

The liquid crystal compositions specified in the following Examples are prepared and studied. The formulas of the liquid crystal compositions and their test results for the performance are shown below.

Comparative Example 1

The liquid crystal composition of Comparative Example 1 is prepared according to each compound and weight percentage listed in Table 2 and then tested for performance by filling the same between two substrates of a liquid crystal display device. The test data is shown in the Table below:

TABLE 2

Formulation of the liquid crystal composition and its test performances

| Code of component | weight percentage | Test results for the performance parameters | |
|---|---|---|---|
| 2CPWO2 | 10 | Δn | 0.109 |
| 3CPWO2 | 8 | Cp | 75 |
| 3C1OWO2 | 8 | Δε | −2.8 |
| 2CC1OWO2 | 6 | t−40° C. | 5 days |
| 3CC1OWO2 | 5 | $K_{11}$ | 12.7 |
| 4CC1OWO2 | 6 | $K_{33}$ | 14.8 |
| 2C1OWO2 | 5 | | |
| 3CPO2 | 9 | | |
| 3CPP2 | 10 | | |
| 5CC2 | 10 | | |
| 4CC3 | 11 | | |
| 5PP1 | 12 | | |
| Total | 100 | | |

Example 1

The liquid crystal composition of Example 1 is prepared according to each compound and weight percentage listed in Table 3 and then tested for performance by filling the same between two substrates of a liquid crystal display device. The test data is shown in the Table below:

TABLE 3

Formulation of the liquid crystal composition and its test performances

| Code of component | weight percentage | Test results for the performance parameters | |
|---|---|---|---|
| 3CPWO4O1 | 10 | Δn | 0.109 |
| 3CPWO3O1 | 8 | Cp | 78 |
| 3C1OWO2 | 8 | Δε | −3.1 |
| 2CC1OWO2 | 6 | t−40° C. | 10 days |
| 1WW0401 | 5 | $K_{11}$ | 13.5 |
| 4CC1OWO2 | 6 | $K_{33}$ | 15.7 |
| 2C1OWO2 | 5 | | |
| 3CPO2 | 9 | | |
| 3CPP2 | 10 | | |
| 5CC2 | 10 | | |
| 4CC3 | 11 | | |
| VCCP1 | 12 | | |
| Total | 100 | | |

Example 2

The liquid crystal composition of Example 2 is prepared according to each compound and weight percentage listed in Table 4 and then tested for performance by filling the same between two substrates of a liquid crystal display device. The test data is shown in the Table below:

TABLE 4

Formulation of the liquid crystal composition and its test performances

| Code of component | weight percentage | Test results for the performance parameters | |
|---|---|---|---|
| 2CPWO2 | 10 | Δn | 0.105 |
| 3CPWO2 | 8 | Cp | 77 |
| 3C1OWO4O1 | 8 | Δε | −3.2 |
| 2CC1OWO3O1 | 6 | t−40° C. | 10 days |
| 3CC1OWO3O1 | 5 | $K_{11}$ | 13.3 |
| 4CC1OWO3O1 | 6 | $K_{33}$ | 15.5 |
| 2C1OWO2 | 5 | | |
| 3CPP2 | 6 | | |
| 3CP2 | 10 | | |
| 5CC2 | 13 | | |
| 4CC3 | 13 | | |
| 5PP1 | 10 | | |
| Total | 100 | | |

Example 3

The liquid crystal composition of Example 3 is prepared according to each compound and weight percentage listed in Table 5 and then tested for performance by filling the same between two substrates of a liquid crystal display device. The test data is shown in the Table below:

TABLE 5

Formulation of the liquid crystal composition and its test performances

| Code of component | weight percentage | Test results for the performance parameters | |
|---|---|---|---|
| 3CWO4 | 10 | Δn | 0.111 |
| 5CWO2 | 8 | Cp | 78 |
| 3CWO2 | 8 | Δε | −3.1 |
| 2CWO3O1 | 6 | t−40° C. | 10 days |
| 3CWO3O1 | 5 | $K_{11}$ | 13.5 |
| 3CWO4O1 | 6 | $K_{33}$ | 15.5 |
| 2CWO4O1 | 5 | | |
| 3PGP2 | 6 | | |
| 4CC3 | 10 | | |
| 3CGPC3 | 3 | | |
| 3PGPC2 | 4 | | |
| 3CCP2 | 6 | | |
| 3CCV | 23 | | |
| Total | 100 | | |

Example 4

The liquid crystal composition of Example 4 is prepared according to each compound and weight percentage listed in Table 6 and then tested for performance by filling the same between two substrates of a liquid crystal display device. The test data is shown in the Table below:

TABLE 6

Formulation of the liquid crystal composition and its test performances

| Code of component | weight percentage | Test results for the performance parameters | |
|---|---|---|---|
| 2CPWO2 | 9 | Δn | 0.109 |
| 3CPWO2 | 9 | Cp | 77 |

TABLE 6-continued

Formulation of the liquid crystal composition and its test performances

| Code of component | weight percentage | Test results for the performance parameters | |
|---|---|---|---|
| 3C1OWO2 | 8 | $\Delta\varepsilon$ | -3.1 |
| 4CCWO3O1 | 6 | t-40° C. | 10 days |
| 3CCWO3O1 | 5 | $K_{11}$ | 13.3 |
| 3CCWO4O1 | 6 | $K_{33}$ | 15.5 |
| 1O3OWO4O1 | 5 | | |
| 3PGP4 | 6 | | |
| 3CCV | 24 | | |
| 3CPPC3 | 5 | | |
| 2PGPC3 | 5 | | |
| 5PP1 | 12 | | |
| Total | 100 | | |

Example 5

The liquid crystal composition of Example 5 is prepared according to each compound and weight percentage listed in Table 7 and then tested for performance by filling the same between two substrates of a liquid crystal display device. The test data is shown in the Table below:

TABLE 7

Formulation of the liquid crystal composition and its test performances

| Code of component | weight percentage | Test results for the performance parameters | |
|---|---|---|---|
| 2CPWO4O1 | 6 | $\Delta$n | 0.113 |
| 2CPWO3O1 | 6 | Cp | 80 |
| 3CPWO2 | 6 | $\Delta\varepsilon$ | -3.2 |
| 3C1OWO3O1 | 8 | t-40° C. | 10 days |
| 2CC1OWO2 | 6 | $K_{11}$ | 14.1 |
| 3CC1OWO4O1 | 5 | $K_{33}$ | 16.5 |
| 4CC1OWO4O1 | 6 | | |
| 1O4OWO4O1 | 5 | | |
| 3CCP2 | 8 | | |
| 3PGP4 | 5 | | |
| 2PGP3 | 5 | | |
| 4CC3 | 11 | | |
| 5CC2 | 11 | | |
| 5PP1 | 12 | | |
| Total | 100 | | |

Example 6

The liquid crystal composition of Example 6 is prepared according to each compound and weight percentage listed in Table 8 and then tested for performance by filling the same between two substrates of a liquid crystal display device. The test data is shown in the Table below:

TABLE 8

Formulation of the liquid crystal composition and its test performances

| Code of component | weight percentage | Test results for the performance parameters | |
|---|---|---|---|
| 2CPWO2 | 8 | $\Delta$n | 0.111 |
| 3CPWO2 | 9 | Cp | 77 |
| 3C1OWO2 | 7 | $\Delta\varepsilon$ | -3.6 |

TABLE 8-continued

Formulation of the liquid crystal composition and its test performances

| Code of component | weight percentage | Test results for the performance parameters | |
|---|---|---|---|
| 2CC1OWO4O1 | 6 | t-40° C. | 10 days |
| 3CC1OWO2 | 4 | $K_{11}$ | 13.5 |
| 1O4OWO3O1 | 6 | $K_{33}$ | 15.7 |
| 4CWO3O1 | 4 | | |
| 4C1OWO4O1 | 4 | | |
| 3PWWO3O1 | 7 | | |
| 5PP1 | 8 | | |
| V2CCP1 | 9 | | |
| 3CCV1 | 12 | | |
| 3CPPC3 | 4 | | |
| 2PGPC3 | 4 | | |
| 3CP2 | 8 | | |
| Total | 100 | | |

Example 7

The liquid crystal composition of Example 7 is prepared according to each compound and weight percentage listed in Table 9 and then tested for performance by filling the same between two substrates of a liquid crystal display device. The test data is shown in the Table below:

TABLE 9

Formulation of the liquid crystal composition and its test performances

| Code of component | weight percentage | Test results for the performance parameters | |
|---|---|---|---|
| 2CPWO4O1 | 6 | $\Delta$n | 0.111 |
| 2CPWO3O1 | 6 | Cp | 82 |
| 1O3OWO4O1 | 6 | $\Delta\varepsilon$ | -3.4 |
| 3C1OWO3O1 | 8 | t-40° C. | 10 days |
| 3CC1OWO3O1 | 6 | $K_{11}$ | 14.6 |
| 3CC1OWO4O1 | 6 | $K_{33}$ | 17.1 |
| 4CC1OWO4O1 | 6 | | |
| 1O4OWO4O1 | 6 | | |
| 3CPPC3 | 4 | | |
| 3CCP2 | 5 | | |
| 3PGP4 | 5 | | |
| 2PGP3 | 5 | | |
| 4CC3 | 12 | | |
| 5CC2 | 12 | | |
| 5PP1 | 7 | | |
| Total | 100 | | |

The present inventors select Comparative Examples similar to Examples of the present invention to highlight the beneficial effects of the liquid crystal composition of the present invention. As can be seen from Comparative Example 1 and Examples 1-7, the low-temperature storage performance of the liquid crystal composition may be significantly improved when the compound of general formula I is comprised; the elastic constants $K_{11}$ and $K_{33}$ as well as contrast ratio of the liquid crystal composition may be significantly increased when the compounds of general formula II-1 and/or general formula II-2, which are neutral components, are comprised. In conclusion, the liquid crystal composition provided by the present invention has suitable optical anisotropy, high elastic constants $K_{11}$ and $K_{33}$, and relatively high clearing point and relatively low dielectric anisotropy. When the liquid crystal composition is applied to a liquid crystal display device, the liquid crystal display device may have better weather resistance and higher contrast ratio.

The above embodiments are merely illustrative of the technical concepts and features of the present invention, and provided for facilitating the understanding and practice of the present invention by those skilled in the art. However, the protection scope of the invention is not limited thereto. Equivalent variations or modifications made without departing from the spirit and essence of the present invention are intended to be contemplated within the protection scope of the present invention.

INDUSTRIAL APPLICABILITY

The liquid crystal compositions related in the present invention can be applied to the field of liquid crystal.

The invention claimed is:

1. A liquid crystal composition, wherein the liquid crystal composition comprises:
at least one compound of general formula I

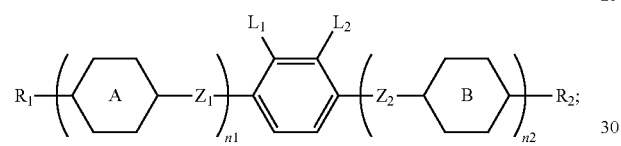
I and
at least one compound selected from a group consisting of the compounds of general formula II-1 and general formula II-2

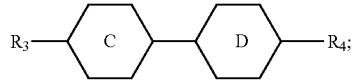
II-1

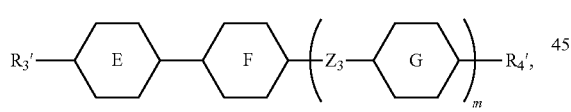
II-2 in which,
$R_1$, $R_2$, $R_3$, $R_4$, $R_3'$ and $R_4'$ each independently represents —H, —F, $C_{1-12}$ alkyl or alkoxy, $C_{2-12}$ alkenyl or alkenoxy, —$OR_5OR_6$,

wherein one or more H on the alkyl or alkoxy and the alkenyl or alkenoxy can be substituted by F, and at least one of $R_1$ and $R_2$ is —$OR_5OR_6$;
$R_6$ represents $C_{1-12}$ alkyl or $C_{2-12}$ alkenyl;
$R_5$ is —$C_3H_6$— or —$C_4H_8$—;
$Z_1$, $Z_2$ and $Z_3$ each independently represents single bond, —COO—, —OCO—, —$CH_2O$—, —$OCH_2$— or —$CH_2CH_2$—;

$L_1$ and $L_2$ each independently represents —F, —Cl, —CN or —NCS;
ring

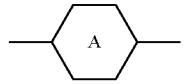

and ring

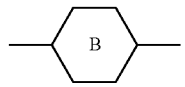

each independently represents

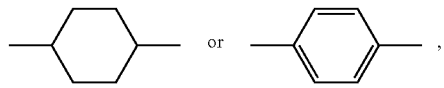

wherein one or more —$CH_2$— in

can be replaced by —O—, one or more H on

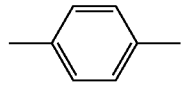

can be substituted by halogen;
ring

ring

ring

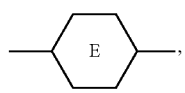

ring

and ring

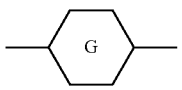

each independently represents

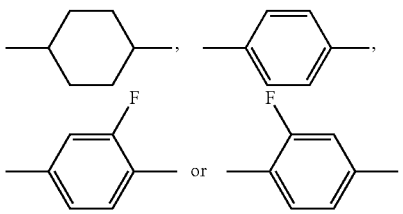

n1 and n2 each independently represents 0, 1, 2 or 3, and when n1 is 2 or 3, ring

can be same or different, $Z_1$ can be same or different; when n2 is 2 or 3, ring

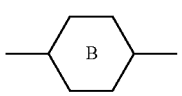

can be same or different, $Z_2$ can be same or different; m represents 1 or 2, and when m is 2, ring

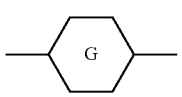

can be same or different, $Z_3$ can be same or different.

2. The liquid crystal composition according to claim 1, wherein the compound of general formula I is selected from a group consisting of the following compounds:

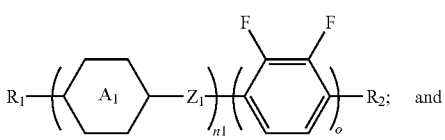
I-1

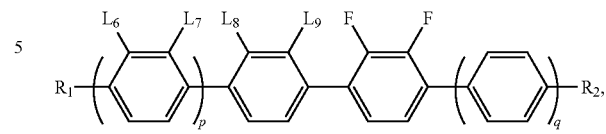
I-2 in which, ring

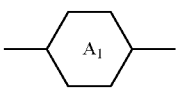

represents

and when n1 is 1, ring

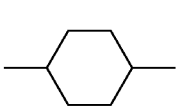

represents

when n1 is 2 or 3, at least one ring

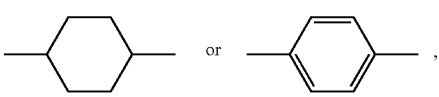

represents

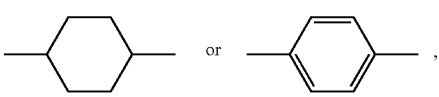

$L_6$, $L_7$, $L_8$ and $L_9$ each independently represents —H or —F;

o represents 1 or 2;

p and q each independently represents 0 or 1.

3. The liquid crystal composition according to claim 2, wherein the compound of general formula I-1 is selected from a group consisting of the following compounds:

I-1-1
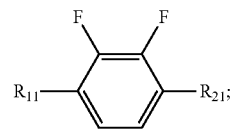

I-1-2
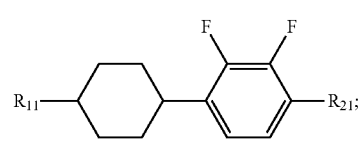

I-1-3
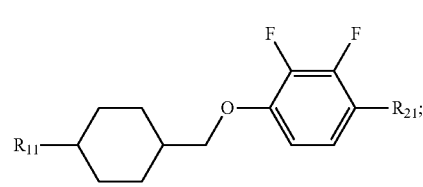

I-1-4
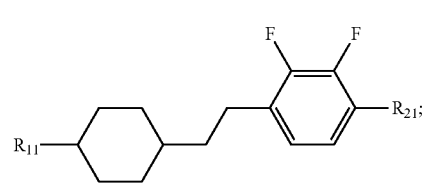

I-1-5
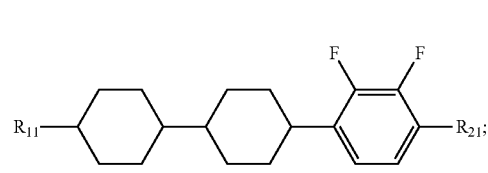

I-1-6
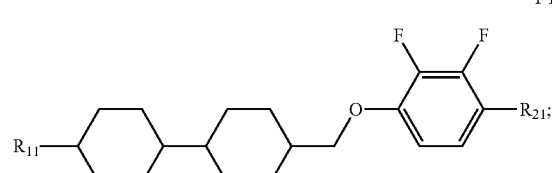

I-1-7
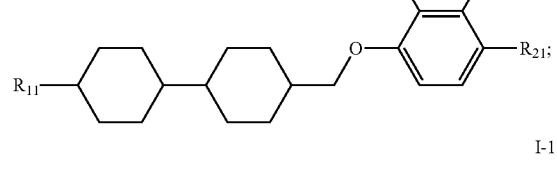

I-1-8
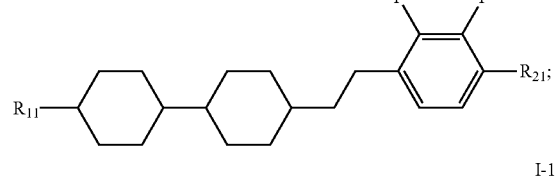

I-1-9
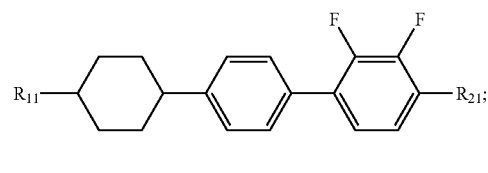

I-1-10
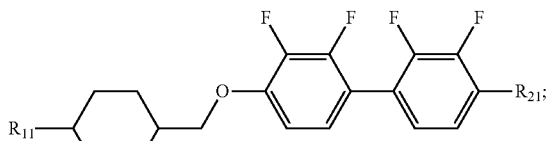

I-1-11
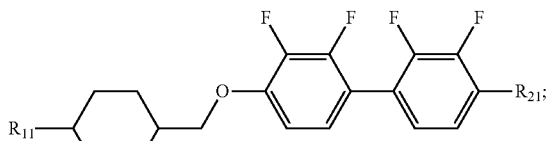

I-1-12
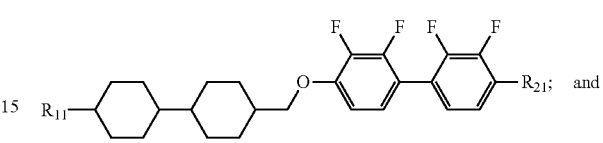

the compound of general formula I-2 is selected from a group consisting of the following compounds:

I-2-1
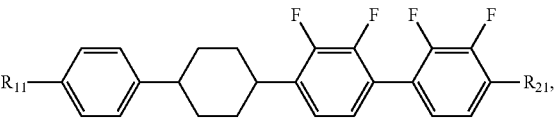

I-2-2
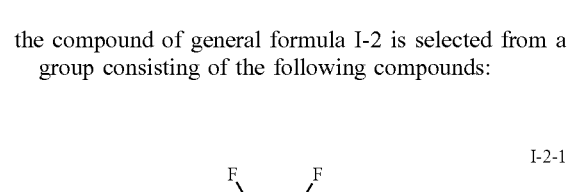

I-2-3
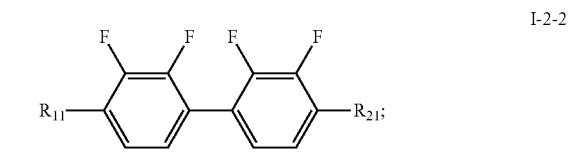

I-2-4
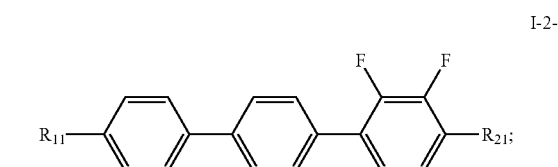

I-2-5
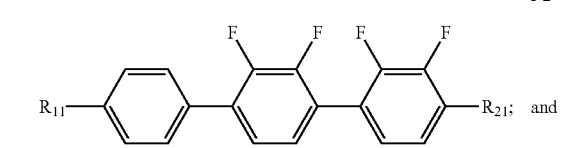

in which, $R_{11}$ and $R_{21}$ each independently represents —H, —F, $C_{1-7}$ alkyl or alkoxy, $C_{2-7}$ alkenyl or alkenoxy, —$OR_{51}OR_{61}$,

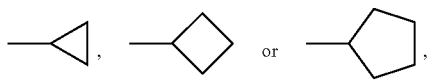

wherein one or more H on the alkyl or alkoxy and the alkenyl or alkenoxy can be substituted by F, and at least one of $R_{11}$ and $R_{21}$ is $-OR_{51}OR_{61}$;

$R_{51}$ is $-C_3H_6-$ or $-C_4H_8-$, and $R_{61}$ represents $C_{1-10}$ alkyl or $C_{2-10}$ alkenyl.

4. The liquid crystal composition according to claim 1, wherein the compound of general formula II-1 is selected from a group consisting of the following compounds:

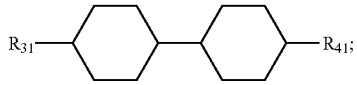
II-1-1

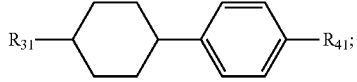
II-1-2

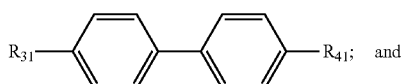
II-1-3

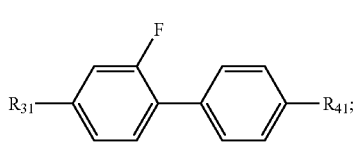
II-1-4 the compound of general formula II-2 is selected from a group consisting of the following compounds:

II-2-1

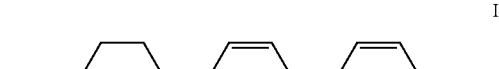
II-2-2

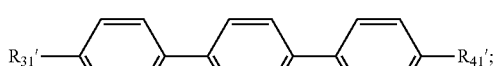
II-2-3

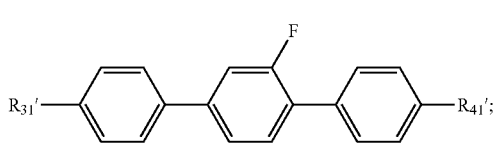
II-2-4

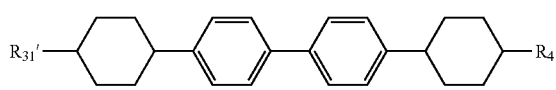
II-2-5

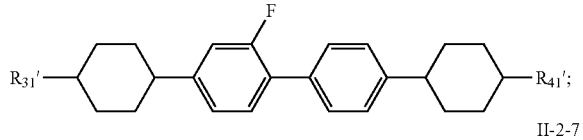
II-2-6

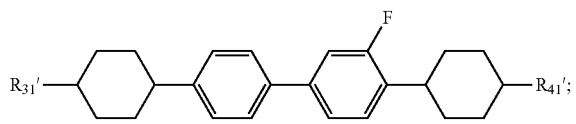
II-2-7

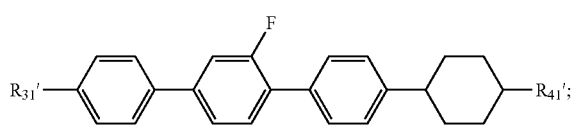
II-2-8

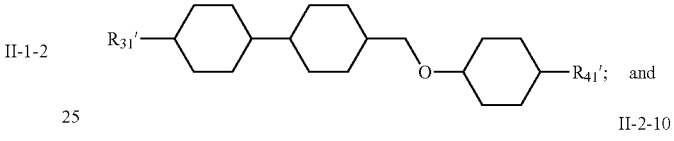
II-2-9

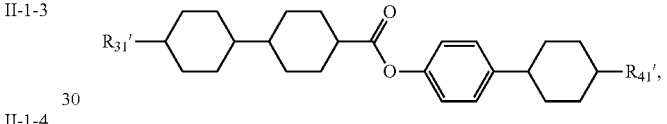
II-2-10

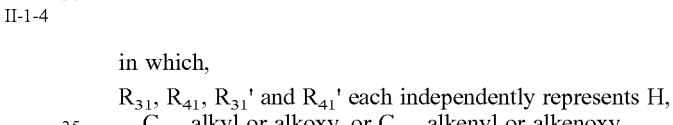

in which, $R_{31}$, $R_{41}$, $R_{31}'$ and $R_{41}'$ each independently represents H, $C_{1-7}$ alkyl or alkoxy, or $C_{2-7}$ alkenyl or alkenoxy.

5. The liquid crystal composition according to claim 1, wherein the liquid crystal composition at least comprises more than 2 wt % of the compound of general formula II-2.

6. The liquid crystal composition according to claim 1, wherein the liquid crystal composition further comprises at least one compound of general formula III

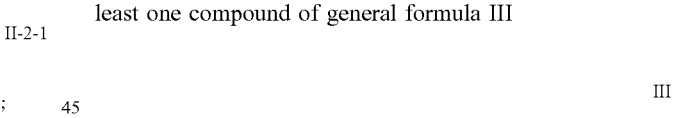
III in which, $R_7$ and $R_8$ each independently represents $-H$, $-F$, $C_{1-12}$ alkyl or alkoxy, $C_{2-12}$ alkenyl or alkenoxy,

wherein one or more H on the alkyl or alkoxy and the alkenyl or alkenoxy can be substituted by F;

$Z_4$ and $Z_5$ each independently represents single bond, $-COO-$, $-OCO-$, $-CH_2O-$, $-OCH_2-$ or $-CH_2CH_2-$;

ring

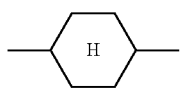

and ring

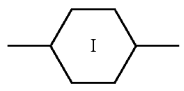

each independently represents

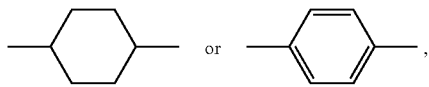

wherein one or more —CH$_2$— in

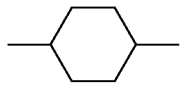

can be replaced by —O—, one or more H on

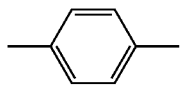

on can be substituted by halogen;

k1 and k2 each independently represents 0, 1, 2 or 3, and when k1 is 2 or 3, ring

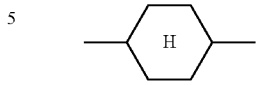

can be same or different, Z$_4$ can be same or different; when k2 is 2 or 3, ring

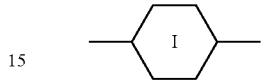

can be same or different, Z$_5$ can be same or different.

7. The liquid crystal composition according to claim 6, wherein the compound of general formula I provides 1 to 60% of the total weight of the liquid crystal composition, the compound selected from a group consisting of the compounds of general formula II-1 and general formula II-2 provides 1 to 55% of the total weight of the liquid crystal composition, and the compound of general formula III provides 0 to 60% of the total weight of the liquid crystal composition.

8. The liquid crystal composition according to claim 7, wherein the compound of general formula I provides 1 to 50% of the total weight of the liquid crystal composition, the compound selected from a group consisting of the compounds of general formula II-1 and general formula II-2 provides 1 to 55% of the total weight of the liquid crystal composition, and the compound of general formula III provides 0 to 55% of the total weight of the liquid crystal composition.

9. A liquid crystal display device comprising the liquid crystal composition of claim 1.

* * * * *